(12) United States Patent
Kurokawa et al.

(10) Patent No.: US 9,918,012 B2
(45) Date of Patent: Mar. 13, 2018

(54) DISPLAY SYSTEM, IMAGING DEVICE, MONITORING DEVICE, DISPLAY DEVICE, AND ELECTRONIC DEVICE

(71) Applicant: SEMICONDUCTOR ENERGY LABORATORY CO., LTD., Kanagawa-ken (JP)

(72) Inventors: Yoshiyuki Kurokawa, Kanagawa (JP); Takayuki Ikeda, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 27 days.

(21) Appl. No.: 14/801,242

(22) Filed: Jul. 16, 2015

(65) Prior Publication Data

US 2016/0021314 A1    Jan. 21, 2016

(30) Foreign Application Priority Data

Jul. 18, 2014    (JP) ................. 2014-147717

(51) Int. Cl.
  *G09G 3/3225*    (2016.01)
  *H04N 5/232*    (2006.01)
  (Continued)

(52) U.S. Cl.
  CPC ....... *H04N 5/23293* (2013.01); *G09G 3/3233* (2013.01); *G09G 3/3648* (2013.01);
  (Continued)

(58) Field of Classification Search
  CPC ....... G09G 2320/103; G09G 2330/021; G09G 3/3233; G09G 3/3648; H04N 5/23245; H04N 5/23293; H04N 5/378
  (Continued)

(56) References Cited

U.S. PATENT DOCUMENTS 5,731,856 A    3/1998    Kim et al.
5,744,864 A    4/1998    Cillessen et al.
              (Continued)

FOREIGN PATENT DOCUMENTS

EP    1737044 A    12/2006
EP    2226847 A    9/2010
              (Continued)

OTHER PUBLICATIONS

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

(Continued)

*Primary Examiner* — Tony Davis
(74) *Attorney, Agent, or Firm* — Husch Blackwell LLP

(57) ABSTRACT

To provide a display system which enables power consumption to be reduced. An imaging device operates in first and second imaging modes. In the first imaging mode, a digital processing circuit converts a third imaging data captured by a first pixel into a digital data and supplied the data to a display device. In the second imaging mode, an analog processing circuit detects a difference data between first and second imaging data and sets a determination signal to an active value in accordance with the difference data. A display device operates in first and second display modes. In the first display mode, an image data is updated to display an image. In the second display mode, an image is displayed without an update of an image data. The switching of the imaging mode and the display mode is performed by setting the determination signal to an active value.

20 Claims, 25 Drawing Sheets

(51) Int. Cl.
  *H04N 5/378*    (2011.01)
  *G09G 3/36*     (2006.01)
  *G09G 3/3233*   (2016.01)
  *H04N 5/369*    (2011.01)
  *H04N 5/3745*   (2011.01)

(52) U.S. Cl.
  CPC ....... *H04N 5/23241* (2013.01); *H04N 5/3696* (2013.01); *H04N 5/378* (2013.01); *H04N 5/37452* (2013.01); *H04N 5/37457* (2013.01); *G09G 2320/103* (2013.01); *G09G 2330/021* (2013.01); *H04N 5/23245* (2013.01)

(58) Field of Classification Search
  USPC .............................................. 345/9, 211, 698
  See application file for complete search history.

(56) References Cited

U.S. PATENT DOCUMENTS

| | | |
|---|---|---|
| 6,294,274 B1 | 9/2001 | Kawazoe et al. |
| 6,563,174 B2 | 5/2003 | Kawasaki et al. |
| 6,727,522 B1 | 4/2004 | Kawasaki et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al. |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 8,576,317 B2 * | 11/2013 | Sakakibara ............ H04N 5/355 348/301 |
| 8,836,626 B2 | 9/2014 | Ikeda |
| 8,854,286 B2 | 10/2014 | Yamazaki et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0112483 A1 * | 6/2003 | Takano ................ H04N 1/4074 358/521 |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0263071 A1 * | 11/2007 | Lee .................... H04N 1/00204 348/14.02 |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0158359 A1 * | 7/2008 | Takeda ................... G01S 11/12 348/148 |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0020211 A1 * | 1/2010 | Inada ................... H03M 1/1023 348/294 |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2011/0090204 A1 * | 4/2011 | Yamazaki ............. G02F 1/1368 345/211 |
| 2011/0102696 A1 | 5/2011 | Yamazaki et al. |
| 2011/0115839 A1 * | 5/2011 | Takahashi ........... H01L 27/1225 345/698 |
| 2012/0038763 A1 * | 2/2012 | Kawada ................. B23B 25/06 348/95 |
| 2012/0262592 A1 * | 10/2012 | Rabii ................. H04N 5/23241 348/208.16 |
| 2012/0294070 A1 * | 11/2012 | Matsuzaki ............ G11C 11/404 365/149 |
| 2013/0222584 A1 * | 8/2013 | Aoki ...................... H04N 5/335 348/143 |
| 2014/0085512 A1 * | 3/2014 | Ikeda ...................... H04N 5/343 348/240.2 |
| 2014/0361296 A1 | 12/2014 | Ikeda |
| 2014/0368417 A1 | 12/2014 | Yamazaki et al. |
| 2015/0205563 A1 * | 7/2015 | Inada ...................... G09G 3/003 345/520 |
| 2015/0332568 A1 * | 11/2015 | Kurokawa ......... H04N 5/37455 348/152 |

(56) References Cited

U.S. PATENT DOCUMENTS

| | | | |
|---|---|---|---|
| 2016/0021314 A1* | 1/2016 | Kurokawa | G09G 3/3233 348/333.01 |
| 2016/0035297 A1* | 2/2016 | Oh | G09G 3/3618 345/212 |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| WO | WO-2004/114391 | 12/2004 |

OTHER PUBLICATIONS

Asaoka.Y et al., "29.1: Polarizer-Free Reflective LCD Combined With Ultra Low-Power Driving Technology", SID Digest '09 : SID International Symposium Digest of Technical Papers, May 31, 2009, pp. 395-398.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.

Clark.S et al., "First Principles Methods Using Castep", Zeitschrift fur Kristallographie, 2005, vol. 220, pp. 567-570.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.

Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.

Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.

Hirao.T et al., "Novel Top-Gate Zinc Oxide Thin-Film Transistors (ZnO TFTs) for AMLCDs", J. Soc. Inf. Display (Journal of the Society for Information Display), 2007, vol. 15, No. 1, pp. 17-22.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Ikeda.T et al., "Full-Functional System Liquid Crystal Display Using CG-Silicon Technology", SID Digest '04 : SID International Symposium Digest of Technical Papers, 2004, vol. 35, pp. 860-863.

Janotti.A et al., "Native Point Defects in ZnO", Phys. Rev. B (Physical Review. B), Oct. 4, 2007, vol. 76, No. 16, pp. 165202-1-165202-22.

Janotti.A et al., "Oxygen Vacancies in ZnO", Appl. Phys. Lett. (Applied Physics Letters) , 2005, vol. 87, pp. 122102-1-122102-3.

Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.

Jin.D et al., "65.2:Distinguished Paper:World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Kikuchi.H et al., "39.1:Invited Paper:Optically Isotropic Nano-Structured Liquid Crystal Composited for Display Applications", SID Digest '09 : SID International Symposium Digest of Technical Papers, May 31, 2009, pp. 578-581.

Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Kikuchi.H et al., "Polymer-Stabilized Liquid,Crystal Blue Phases", Nature Materials, Sep. 2, 2002, vol. 1, pp. 64-68.

Kim.S et al., "High-Performance oxide thin film transistors passivated by various gas plasmas", 214th ECS Meeting, 2008, No. 2317, ECS.

Kimizuka.N et al., "Spinel,YbFe2O4, and Yb2Fe3O7 Types of Structures for Compounds in the In2O3 and Sc2O3—A2O3—BO Systems [A; Fe, Ga, or Al; B: Mg, Mn, Fe, Ni, Cu,or Zn] at Temperatures Over 1000° C.", Journal of Solid State Chemistry, 1985, vol. 60, pp. 382-384.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System", Journal of Solid State Chemistry, Apr. 1, 1995, vol. 116, No. 1, pp. 170-178.

Kitzerow.H et al., "Observation of Blue Phases in Chiral Networks", Liquid Crystals, 1993, vol. 14, No. 3, pp. 911-916.

Kurokawa.Y et al., "UHF RFCPUS on Flexible and Glass Substrates for Secure RFID Systems", Journal of Solid-State Circuits , 2008, vol. 43, No. 1, pp. 292-299.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Lee.H et al., "Current Status of, Challenges to, and Perspective View of AM-OLED", IDW '06 : Proceedings of the 13th International Display Workshops, Dec. 7, 2006, pp. 663-666.

(56) References Cited

OTHER PUBLICATIONS

Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.

Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.

Li,C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Masuda.S et al., "Transparent thin film transistors using ZnO as an active channel layer and their electrical properties", J. Appl. Phys. (Journal of Applied Physics), Feb. 1, 2003, vol. 93, No. 3, pp. 1624-1630.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Miyasaka.M, "Suftla Flexible Microelectronics on Their Way to Business", SID Digest '07 : SID International Symposium Digest of Technical Papers, 2007, vol. 38, pp. 1673-1676.

Mo.Y et al., "Amorphous Oxide TFT Backplanes for Large Size AMOLED Displays", IDW '08 : Proceedings of the 6th International Display Workshops, Dec. 3, 2008, pp. 581-584.

Nakamura.M et al., "The phase relations in the $In_2O_3$—$Ga_2ZnO_4$—ZnO system at 1350° C.", Journal of Solid State Chemistry, Aug. 1, 1991, vol. 93, No. 2, pp. 298-315.

Nakamura.M, "Synthesis of Homologous Compound with New Long-Period Structure", Nirim Newsletter, Mar. 1, 1995, vol. 150, pp. 1-4.

Nomura.K et al., "Amorphous Oxide Semiconductors for High-Performance Flexible Thin-Film Transistors", Jpn. J. Appl. Phys. (Japanese Journal of Applied Physics), 2006, vol. 45, No. 5B, pp. 4303-4308.

Nomura.K et al., "Carrier transport in transparent oxide semiconductor with intrinsic structural randomness probed using single-crystalline InGaO3(ZnO)5 films", Appl. Phys. Lett. (Applied Physics Letters), Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Nowatari.H et al., "60.2: Intermediate Connector With Suppressed Voltage Loss for White Tandem OLEDs", SID Digest '09 : SID International Symposium Digest of Technical Papers, May 31, 2009, vol. 40, pp. 899-902.

Oba.F et al., "Defect energetics in ZnO: A hybrid Hartree-Fock density functional study", Phys. Rev. B. (Physical Review. B), 2008, vol. 77, pp. 245202-1-245202-6.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ohara.H et al., "21.3:4.0 In. QVGA AMOLED Display Using In—Ga—Zn-Oxide TFTs With a Novel Passivation Layer", SID Digest '09 : SID International Symposium Digest of Technical Papers, May 31, 2009, pp. 284-287.

Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Orita.M et al., "Amorphous transparent conductive oxide InGaO3(ZnO)m (m<4):a Zn4s conductor", Philosophical Magazine, 2001, vol. 81, No. 5, pp. 501-515.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Osada.T et al., "15.2: Development of Driver-Integrated Panel using Amorphous In—Ga—Zn-Oxide TFT", SID Digest '09 : SID International Symposium Digest of Technical Papers, May 31, 2009, pp. 184-187.

Osada.T et al., "Development of Driver-Integrated Panel Using Amorphous In—Ga—Zn-Oxide TFT", AM-FPD '09 Digest of Technical Papers, Jul. 1, 2009, pp. 33-36.

Park.J et al., "Amorphous Indium-Gallium-Zinc Oxide TFTs and Their Application for Large Size AMOLED", AM-FPD '08 Digest of Technical Papers, Jul. 2, 2008, pp. 275-278.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Park.J et al., "Electronic Transport Properties of Amorphous Indium-Gallium-Zinc Oxide Semiconductor Upon Exposure to Water", Appl. Phys. Lett. (Applied Physics Letters), 2008, vol. 92, pp. 072104-1-072104-3.

Park.J et al., "High performance amorphous oxide thin film transistors with self-aligned top-gate structure", IEDM 09: Technical Digest of International Electron Devices Meeting, Dec. 7, 2009, pp. 191-194.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Park.S et al., "Challenge to Future Displays: Transparent AM-OLED Driven by Peald Grown ZnO TFT", IMID '07 Digest, 2007, pp. 1249-1252.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Sakata.J et al., "Development of 4.0-In. AMOLED Display With Driver Circuit Using Amorphous In—Ga—Zn-Oxide TFTs", IDW '09 : Proceedings of the 16th International Display Workshops, 2009, pp. 689-692.

Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Tsuda.K et al., "Ultra Low Power Consumption Technologies for Mobile TFT-LCDs", IDW '02 : Proceedings of the 9th International Display Workshops, Dec. 4, 2002, pp. 295-298.

Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

* cited by examiner

FIG. 3A1
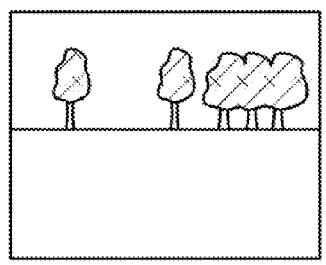
1st Imaging Data
FIG. 3A2
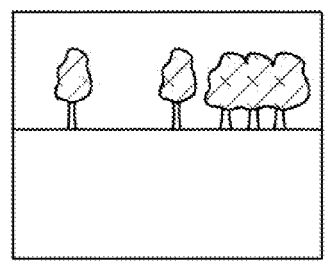
2nd Imaging Data
FIG. 3B1
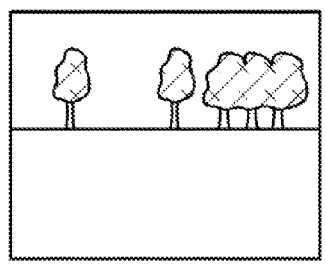
1st Imaging Data
FIG. 3B2
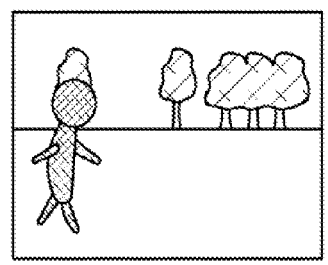
2nd Imaging Data
FIG. 3C
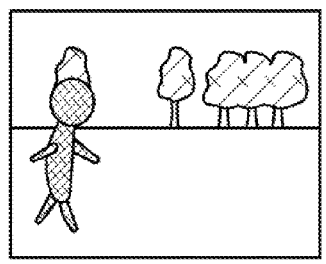
3rd Imaging Data

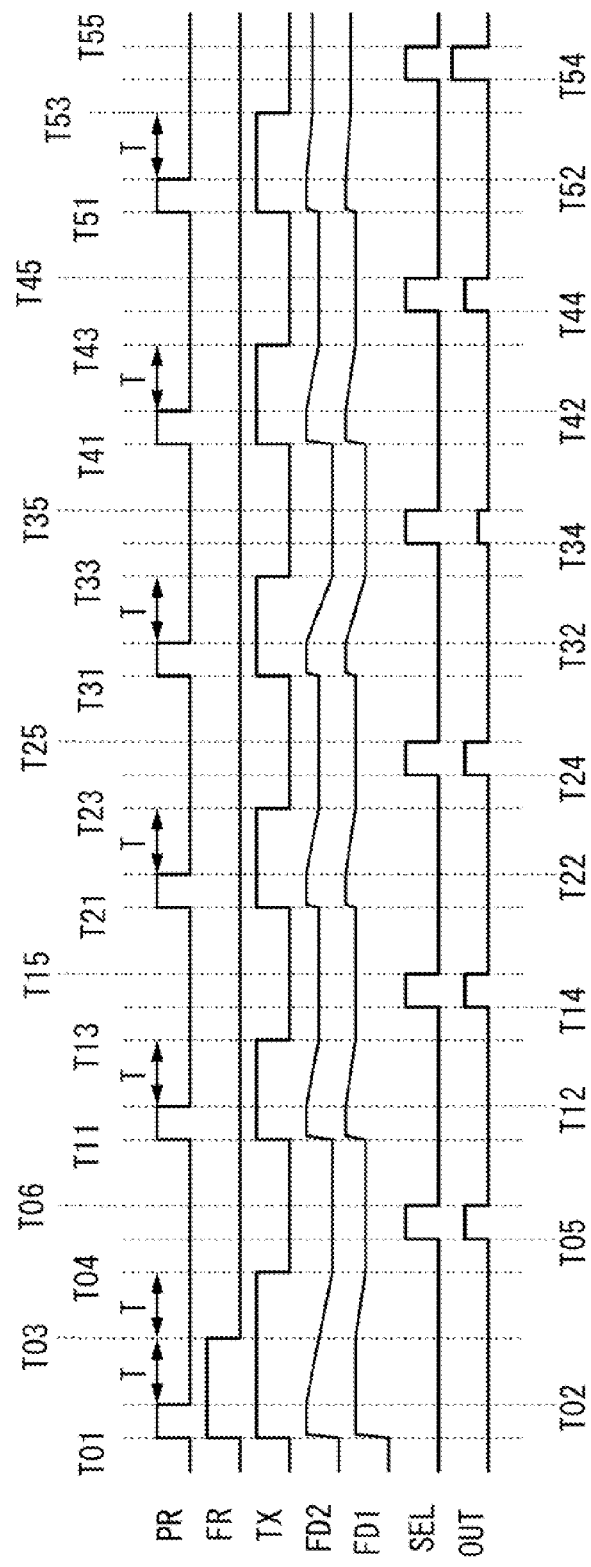

FIG. 23A1
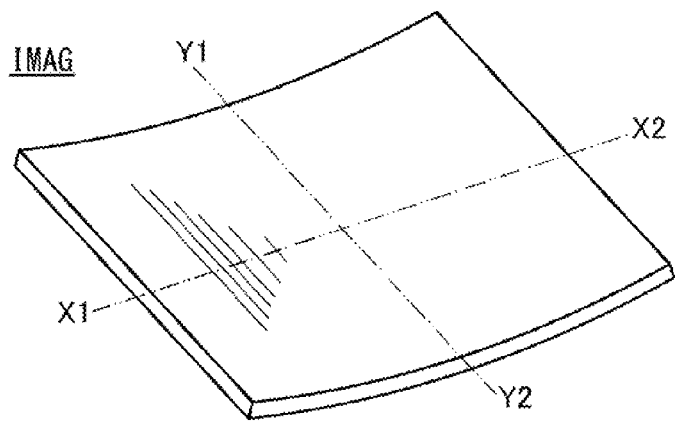
FIG. 23A2
FIG. 23A3
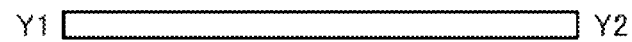
FIG. 23B1
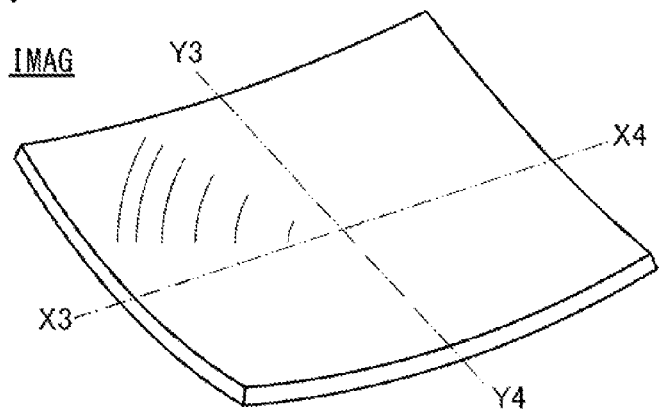
FIG. 23B2
FIG. 23B3

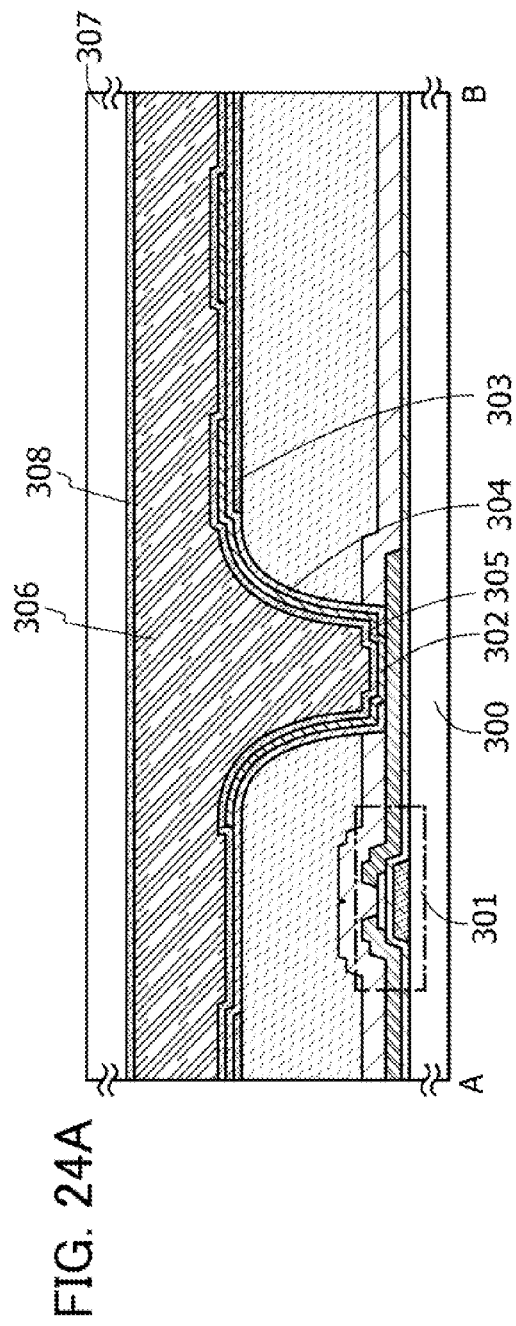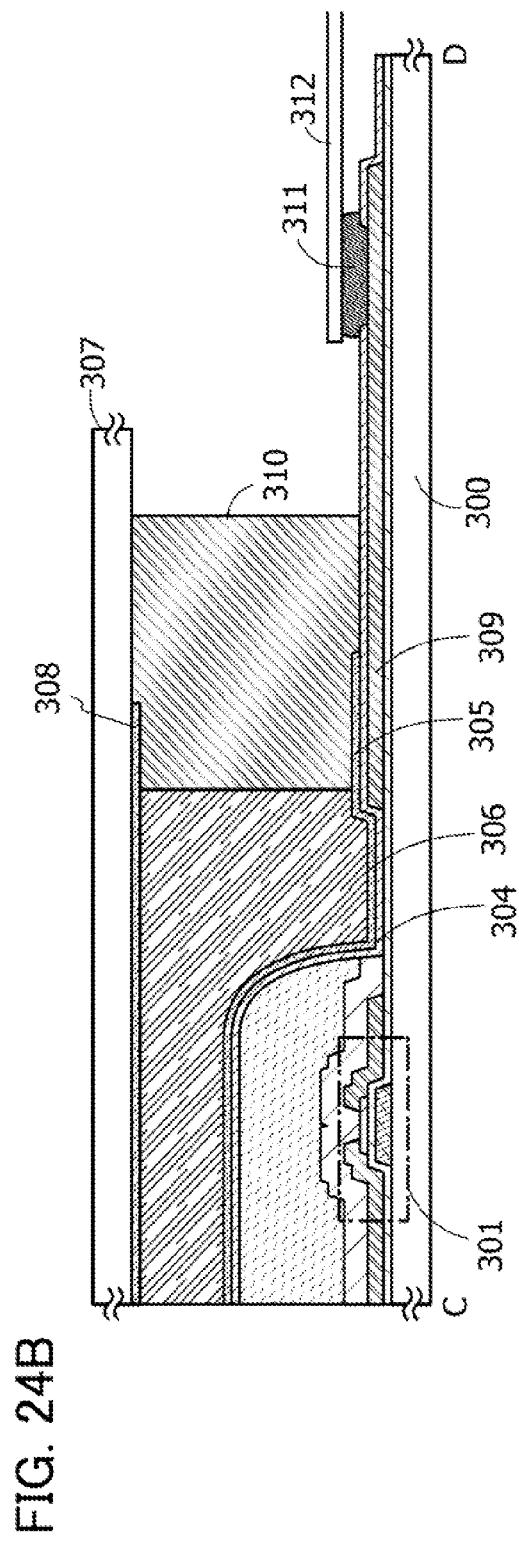

DISPLAY SYSTEM, IMAGING DEVICE, MONITORING DEVICE, DISPLAY DEVICE, AND ELECTRONIC DEVICE

BACKGROUND OF THE INVENTION

1. Field of the Invention

One embodiment of the present invention relates to a display system, an imaging device, a monitoring device, a display device, and an electronic device.

Note that one embodiment of the present invention is not limited to the above technical field. The technical field of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, an imaging device, a memory device, a method for driving any of them, and a method for manufacturing any of them.

2. Description of the Related Art

A display device in which a transistor with a small amount of leakage current is used in a pixel so as to reduce a frequency of updating image data has been proposed (e.g., Patent Document 1). The necessity of updating image data is determined on the basis of a result of digital difference processing where an image data in a current frame and an image data in a prior frame are compared. A reduction in power consumption of the display device is attempted by a reduction of the frequency of updating image data.

REFERENCE

Patent Document

[Patent Document] United States Patent Application Publication No. 2011/0090204

SUMMARY OF THE INVENTION

For a further reduction in power consumption in the entire display system, a reduction in power consumed in digital processing is essential.

An object of one embodiment of the present invention is to provide a novel display system, a novel imaging device, a novel display device, a novel electronic device, and the like.

Another object of one embodiment of the present invention is to provide a display system or the like having a novel structure device with which a reduction in power consumption can be achieved. Another object of one embodiment of the present invention is to provide a display system or the like having a novel structure with which the necessity of updating image data can be determined without a reduction in display quality.

Note that the objects of the present invention are not limited to the above objects. The objects described above do not disturb the existence of other objects. The other objects are the ones that are not described above and will be described below. The other objects will be apparent from and can be derived from the description of the specification, the drawings, and the like by those skilled in the art. One embodiment of the present invention is to solve at least one of the aforementioned objects and the other objects.

One embodiment of the present invention is a display system including an imaging device and a display device. The imaging device includes a first pixel, an analog processing circuit, and a digital processing circuit. The first pixel has a function of outputting an imaging data and a function of storing a difference data between a first imaging data and a second imaging data. The imaging device has a function of operating in a first imaging mode and a second imaging mode. In the first imaging mode, the digital processing circuit converts a third imaging data captured by the first pixel into a digital data. In the second imaging mode, the analog processing circuit detects a difference data, and in the case where a difference is generated between the first imaging data and the second imaging data, a determination signal has an active value. The display device has a function of operating in a first display mode and a second display mode. In the first display mode, the display device has a function of updating an image data to display an updated data. In the second display mode, the display device has a function of displaying an image data without an update. A switching of mode from the second imaging mode to the first imaging mode and a switching of mode from the second display mode to the first display mode are performed by setting the determination signal to an active value.

In the display system of one embodiment of the present invention, the analog processing circuit is preferably a circuit that performs a sum-of-absolute-difference operation of the difference data and sets the determination signal to an active value when a result of the operation does not agree with a predetermined value.

In the display system of one embodiment of the present invention, the analog processing circuit preferably includes a subtraction circuit, an absolute value circuit, and an adder circuit.

In the display system of one embodiment of the present invention, the analog processing circuit is preferably a circuit that supplies a current in accordance with a degree of difference between a current value corresponding to the difference data and a reference current value and sets the determination signal to an active value when a difference of current supply is generated.

In the display system of one embodiment of the present invention, the digital processing circuit preferably includes an A/D converter.

In the display system of one embodiment of the present invention, the imaging device preferably switches from the second mode to the first mode when a predetermined period of time has passed.

In the display system of one embodiment of the present invention, the first pixel preferably includes a first transistor and a photoelectric conversion element, the display device preferably includes a second pixel, the second pixel preferably includes a second transistor and a display element, and each of the first transistor and the second transistor preferably includes an oxide semiconductor in a channel formation region.

In the display system of one embodiment of the present invention, the photoelectric conversion element preferably includes a compound semiconductor including selenium.

In the display system of one embodiment of the present invention, the display element is preferably a liquid crystal element or a light-emitting element.

One embodiment of the present invention is an imaging device that an outputs a determination signal and an image data to a display device having a function of switching between a first display mode in which the image data is updated and displayed and a second display mode in which the image data is displayed without an update and that includes a first pixel, an analog processing circuit, and a digital processing circuit. The first pixel has a function of outputting the imaging data and a function of storing a difference data between a first imaging data and a second imaging data. The imaging device has a function of operating in a first imaging mode and a second imaging mode. In the first imaging mode, the digital processing circuit coverts a third imaging data captured by the first pixel into a digital data, and the digital data is output to the display device as an image data. In the second imaging mode, the analog processing circuit detects the difference data and sets a determination signal to an active value when a difference between the first imaging data and the second imaging data is generated. A switching of mode from the second imaging mode to the first imaging mode and a switching of mode from the second display mode to the first display mode are performed by setting the determination signal to an active value.

One embodiment of the present invention is a display device that has a function of switching between a first display mode in which an image data is updated and displayed and a second display mode in which the image data is displayed without an update and that includes a second pixel, a source driver, a gate driver, and a control circuit. The control circuit has a function of switching a mode from the second display mode to the first display mode when a determination signal output from the imaging device is set to an active value. The source driver and the gate driver have a function of applying a video voltage corresponding to an image data supplied to the second pixel to display an image in the first display mode, and a function of making a video voltage corresponding to an image data supplied to the second pixel to be held in the pixel to display an image in the second display mode.

Note that other embodiments of the present invention will be described in the following embodiments with reference to the drawings.

One embodiment of the present invention can provide a display system with a novel structure, a novel imaging device, a novel display device, a novel electronic device, or the like.

One embodiment of the present invention can provide a display system or the like having a novel structure with which a reduction in power consumption can be achieved. Another embodiment of the present invention can provide a display system or the like having a novel structure with which the necessity of updating an image data can be determined without a degradation of display quality.

Note that the effects of one embodiment of the present invention are not limited to the above effects. The effects described above do not disturb the existence of other effects. The other effects are the ones that are not described above and will be described below. The other effects will be apparent from and can be derived from the description of the specification, the drawings, and the like by those skilled in the art. One embodiment of the present invention is to have at least one of the aforementioned effects and the other effects. Accordingly, one embodiment of the present invention does not have the aforementioned effects in some cases.

BRIEF DESCRIPTION OF THE DRAWINGS

FIGS. 3A1, 3A2, 3B1, 3B2, and 3C are each a schematic view for illustrating one embodiment of the present invention.

FIG. 5 is a timing chart for describing one embodiment of the present invention.

FIGS. 23A1, 23A2, 23A3, 23B1, 23B2, and 23B3 are schematic diagrams showing one embodiment of the present invention.

FIGS. 24A and 24B are cross-sectional views illustrating one embodiment of the present invention.

BEST MODE FOR CARRYING OUT THE INVENTION

Figure 1:
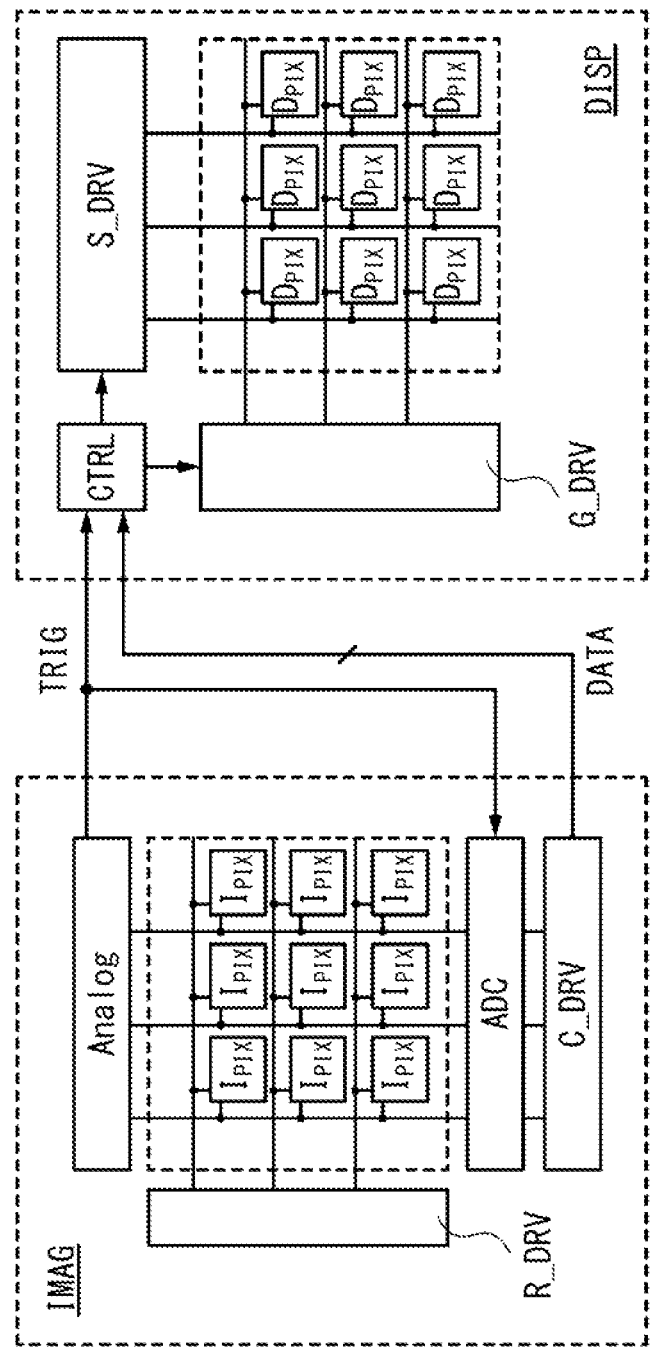
FIG. 1 is a block diagram for describing one embodiment of the present invention.

Hereinafter, embodiments will be described with reference to drawings. However, the embodiments can be implemented with various modes. It will be readily appreciated by those skilled in the art that modes and details can be changed in various ways without departing from the spirit and scope of the present invention. Thus, the present invention should not be interpreted as being limited to the following description of the embodiments.

In the drawings, the size, the layer thickness, or the region is exaggerated for clarity in some cases. Therefore, embodiments of the present invention are not limited to such a scale. Note that the drawings are schematic views showing ideal examples, and embodiments of the present invention are not limited to shapes or values shown in the drawings. For example, the following can be included: variation in signal, voltage, or current due to noise or difference in timing.

In this specification and the like, a transistor is an element having at least three terminals: a gate, a drain, and a source. The transistor includes a channel region between the drain (a drain terminal, a drain region, or a drain electrode) and the source (a source terminal, a source region, or a source electrode) and current can flow through the drain, the channel region, and the source.

Here, since the source and the drain of the transistor change depending on the structure, the operating condition, and the like of the transistor, it is difficult to define which is a source or a drain. Thus, a portion that functions as a source or a portion that functions as a drain is not referred to as a source or a drain in some cases. In that case, one of the source and the drain might be referred to as a first electrode, and the other of the source and the drain might be referred to as a second electrode.

Note that in this specification, ordinal numbers such as "first", "second", and "third" are used in order to avoid confusion among components, and thus do not limit the number of the components.

Note that in this specification, when it is described that "A and B are connected to each other", the case where A and B are electrically connected to each other is included in addition to the case where A and B are directly connected to each other. Here, the expression "A and B are electrically connected" means the case where electric signals can be transmitted and received between A and B when an object having any electric action exists between A and B.

Note that in this specification, terms for describing arrangement, such as "over" and "under", are used for convenience for describing the positional relation between components with reference to drawings. Further, the positional relation between components is changed as appropriate in accordance with a direction in which each component is described. Thus, there is no limitation on terms used in this specification, and description can be made appropriately depending on the situation.

Note that the layout of circuit blocks in a block diagram in a drawing specifies the positional relation for description. Thus, even when a drawing shows that different functions are achieved in different circuit blocks, an actual circuit block may be configured so that the different functions are achieved in the same circuit block. The functions of circuit blocks in diagrams are specified for description, and even in the case where one circuit block is illustrated, blocks might be provided in an actual circuit block so that processing performed by one circuit block is performed by a plurality of circuit blocks.

In this specification, the term "parallel" indicates that the angle formed between two straight lines is greater than or equal to −10° and less than or equal to 10°, and accordingly also includes the case where the angle is greater than or equal to −5° and less than or equal to 5°. In addition, the term "perpendicular" indicates that the angle formed between two straight lines is greater than or equal to 80° and less than or equal to 100°, and accordingly also includes the case where the angle is greater than or equal to 85° and less than or equal to 95°.

In this specification, trigonal and rhombohedral crystal systems are included in a hexagonal crystal system.

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

Embodiment 1

<Structure of Display System>

A structure of a display system of one embodiment of the present invention will be described with reference to FIG. 1.

In this specification and the like, the display system indicates any system including a display device. The display system may include a semiconductor element such as a transistor, a semiconductor device, an arithmetic device, a memory device, an imaging device, and the like, in addition to a display device.

In this specification and the like, the display device indicates any device having a display function. The display device includes a plurality of pixels, a driver circuit for driving the pixels, and the like. The display device also includes a control circuit, a power supply circuit, a signal generation circuit, and the like in some cases.

In this specification and the like, the imaging device indicates any device having an imaging function. The imaging device also indicates a circuit having an imaging function or an entire system including such a circuit.

FIG. 1 is a block diagram showing a configuration of a display system of one embodiment of the present invention. The display system includes an imaging device IMAG and a display device DISP.

First, the imaging device IMAG is described.

In FIG. 1, the imaging device IMAG includes pixels $I_{PIX}$, an analog processing circuit Analog, an A/D converter ADC, a column driver C_DRV, and a row driver R_DRV.

The imaging device IMAG operates in a first imaging mode and a second imaging mode.

In the first imaging mode, the pixels $I_{PIX}$ in each row are sequentially selected by the row driver R_DRV, and the selected pixels $I_{PIX}$ in each row output an imaging data. Note that the first imaging mode is referred to as a first mode (1st mode) or a digital operation mode in some cases.

In the second imaging mode, the pixels $I_{PIX}$ in each row are sequentially selected by the row driver R_DRV and a data including information of a difference between an imaging data in a reference frame and an imaging data in a current frame, i.e., difference data, is output from the selected pixels $I_{PIX}$ in each row. Note that the second imaging mode is referred to as a second mode (2nd mode) or an analog operation mode in some cases.

Note that the imaging data in the reference frame in the second imaging mode is referred to as a first imaging data in some cases. The imaging data in the current frame in the second imaging mode is referred to as a second imaging data in some cases. Furthermore, an imaging data in the first imaging mode is referred to as a third imaging data in some cases.

Each of the pixels $I_{PIX}$ includes a photoelectric conversion element and at least one transistor. The pixel $I_{PIX}$ has a function of capturing an imaging data by imaging operation. Furthermore, the pixel $I_{PIX}$ has a function of storing a difference data between the imaging data in the reference frame and the imaging data in the current frame. A specific circuit configuration of the pixels $I_{PIX}$ having the function of capturing an imaging data and a function of storing a difference data is described later.

Note that the transistor included in the pixel $I_{PIX}$ is referred to as a first transistor in some cases. For the photoelectric conversion element, for example, an element utilizing a photovoltaic effect such as a photodiode and an element utilizing a photoconductive effect, or a semiconductor containing selenium or the like can be used.

The analog processing circuit Analog executes analog data processing on imaging data which is analog data output from each pixel $I_{PIX}$. More specifically, in the case where the analog processing circuit Analog detects the difference data output from each pixel $I_{PIX}$ and determines that there is a difference between the imaging data in the reference frame and an imaging data in the current frame, a determination signal TRIG is set to an active value. In the case where the analog processing circuit Analog determines that there is no difference therebetween, the determination signal TRIG is set to an inactive value.

The detection of a difference data by the analog processing circuit Analog can be executed in the following ways. For example, a way is that the sum-of-absolute-difference operation is performed on the difference data output from each pixel $I_{PIX}$ and whether the operation result agrees with the predetermined value or not is determined. Another way is that a system in which a current is supplied in accordance with the degree of difference between a reference current value and a current value corresponding to the difference data output from each pixel $I_{PIX}$ and whether a difference of current supply is generated or not is determined. A specific circuit configuration of the analog processing circuit Analog that can outputs the determination signal TRIG depending on the presence of the difference between the imaging data in the reference frame and the imaging data in the current frame is described later.

Setting the determination signal TRIG to an active value may indicate outputting an "H" signal (also referred to as a signal with an H level) in the case where a circuit operating with the determination signal TRIG is a high active circuit. In contrast, setting the determination signal TRIG to an inactive value may indicate, for example, outputting an "L" signal (also referred to as a signal with an L level) in the case where a circuit operating with the determination signal TRIG is a high active circuit. In the case where the circuit operating with the determination signal TRIG is a low active circuit, "H" and "L" of the output signal are substituted for "L" and "H" in the above description, respectively.

The determination signal TRIG is a signal that transfers a mode of the imaging device IMAG from a second imaging mode to the first imaging mode. In addition, the determination signal TRIG is a signal that switches a mode of the display device DISP (described later) from a second display mode to a first display mode.

The A/D converter ADC converts the imaging data output from each pixel $I_{PIX}$ into a digital data by A/D conversion. The column driver C_DRV outputs the digital data in respective columns sequentially to the display device DISP as data DATA. The data DATA is an image data supplied to the display device DISP.

As each of the row driver R_DRV and the column driver C_DRV, any of a variety of circuits such as a decoder and a shift register is used.

Next, the display device DISP is described.

The display device DISP operates in the first display mode and the second display mode. A specific configuration example of the display DISP operating in the first display mode and the second display mode is described later.

In FIG. 1, the display device DISP includes pixels $D_{PIX}$, a control circuit CTRL, a source driver S_DRV, and a gate driver G_DRV.

The display device DISP has a function of updating an image data and displaying the image data in the first display mode. Note that the first display mode is referred to as a third mode (3rd mode) or a normal display mode in some cases.

The display device DISP has a function of displaying an image data without an update in the second display mode. Note that the second display mode refers to a fourth mode (4th mode) or an idling stop mode in some cases.

The pixel $D_{PIX}$ includes a display element and at least one transistor. The pixel $D_{PIX}$ has a function of displaying an image with a video voltage corresponding to an image data. In addition, the pixel $D_{PIX}$ has a function of holding a video voltage under a condition that an image data is not updated.

Note that the transistor included in the pixel $D_{PIX}$ is referred to as a second transistor in some cases. Examples of the display element include a liquid crystal element and a light-emitting element.

Furthermore, the transistor included in the pixel $D_{PIX}$ preferably has a small amount of off-state current. As the transistor, a transistor including an oxide semiconductor in a channel formation region (OS transistor) is preferably used.

A preferable reason of using an OS transistor is that the amount of off-state current can be extremely reduced when the oxide semiconductor is made intrinsic or substantially intrinsic by reducing the concentration of impurities in the oxide semiconductor. When the OS transistor with a small amount of off-state current is used as a transistor holding a video voltage in the pixel $D_{PIX}$, a potential that has been written can be held owing to the small amount of off-state current; accordingly, an image can be displayed without applying a video voltage additionally. In other words, the frequency of applying a video voltage can be reduced by stopping operations of the source driver S_DRV and the gate driver G_DRV, and thus low power consumption can be achieved.

The control circuit CTRL supplies a control signal to the source driver S_DRV and the gate driver G_DRV. The control signal supplied to the gate driver G_DRV includes a gate start pulse, a gate clock signal, or the like. The control signal supplied to the source driver S_DRV includes a source start pulse, a source clock signal, or the like. The control circuit CTRL generates a video voltage written to the pixel $D_{PIX}$ on the basis of the data DATA and supplies the video voltage to the source driver S_DRV.

The control circuit CTRL switches between the supply of the control signal and the video voltage in the first display mode and the non-supply thereof in the second display mode.

For example, in the first display mode, the control circuit CTRL supplies a control signal and a video voltage. The display device DISP displays an image corresponding to an additional applied video voltage written to the pixel $D_{PIX}$. In the first display mode, an image can be display by additional application of a video voltage based on an image data supplied from the imaging device IMAG.

In the second display mode, the control circuit CTRL stops supplying the control signal and supplying the video signal. The display device DISP displays an image by holding the video voltage that has been written to the pixel $D_{PIX}$. In the second display mode, an image can be displayed only by holding the video voltage that has been written to the pixel $D_{PIX}$ without using an image data supplied from the imaging device IMAG.

For each of the source driver S_DRV and the gate driver G_DRV, a shift register, a buffer, or the like is used.

Next, the operation of a display system including the imaging device IMAG and the display device DISP shown in FIG. 1 is described with reference to FIGS. 2A and 2B and FIGS. 3A1, 3A2, 3B1, 3B2, and 3C.

Figure 2A:
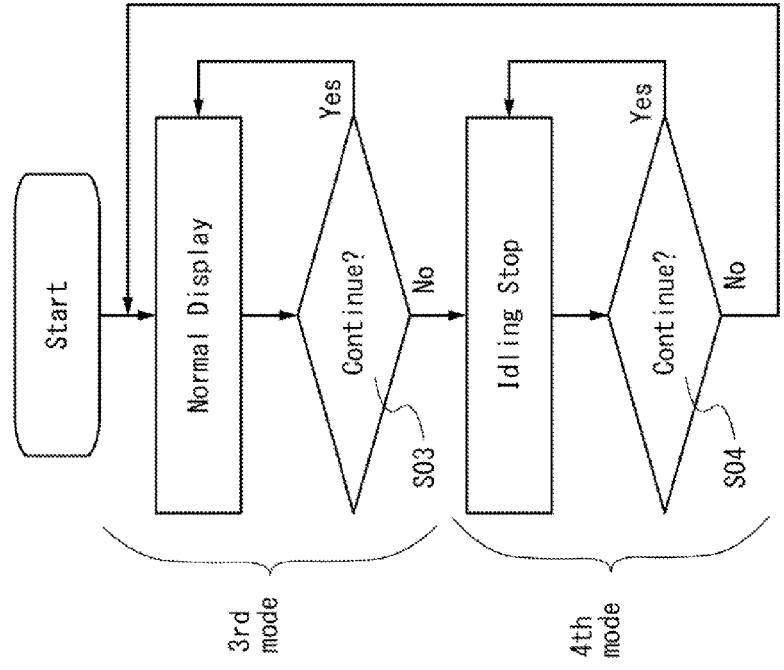
FIGS. 2A and 2B are each a flow chart showing one embodiment of the present invention.

First, an operation of the first imaging mode is described (see FIG. 2A). In the first imaging mode, a third imaging data captured by the pixel $I_{PIX}$ is converted into digital data by A/D conversion. For example, in the case where the third imaging data is data of a clump of trees and a person (see FIG. 3C), the third image data is converted into a digital data.

In the first imaging mode, the determination TRIG is set to an active value (hereinafter, referred to as "H"). In the first imaging mode, capturing image is performed once or a plurality of times.

Next, an operation of switching the mode from the first imaging mode to the second imaging mode is described (see Step S01 in FIG. 2A). This is executable by providing conditions in advance. Examples of the conditions include passage of a predetermined period of time and input of a control signal for terminating the digital processing. When the conditions are satisfied, the mode is switched from the first imaging mode to the second imaging mode.

When the mode is switched from the first imaging mode to the second imaging mode, the determination signal TRIG is set to an inactive value (hereinafter, referred to as "L"). The reference frame in the second imaging mode corresponds to an imaging frame just before switching from the first imaging mode to the second imaging mode. In other words, the imaging data in the reference frame in the second imaging mode is the last imaging data captured in the first imaging mode.

Next, an operation of the second imaging mode is described (see FIG. 2A). In the second imaging mode, analog processing in which a difference data between an imaging data in the reference frame and the imaging data in the current frame is detected is performed in the analog processing circuit Analog. As a result of the analog processing, when there is no difference between the first imaging data and the second imaging data, i.e., when a determination signal TRIG is not generated, the analog processing continues. In contrast, when there is a difference between the first imaging data and the second imaging data as a result of the analog processing, i.e., when a determination signal TRIG is generated, the mode is switched to the first imaging mode (see Step S02 in FIG. 2A).

For example, in the case where both the first imaging data and the second imaging data are data of an image of a clump of trees (see FIGS. 3A1 and 3A2), the difference therebetween is zero. Thus, the determination signal TRIG is not generated. In contrast, in the case where the first imaging data is data of an image of a clump of trees (see FIG. 3B1) and the second imaging data is data of an image of a clump of trees and a person (see FIG. 3B2), the difference therebetween is not zero, and the determination signal TRIG is generated accordingly. Then, in accordance with the generation of the determination signal TRIG, the mode of the imaging device IMAG is switched from the second imaging mode to the first imaging mode. Note that in the drawings, the first imaging data and the second imaging data show the same scenery but differ in time of capturing the image. Therefore, the first imaging data may be represented as imaging data in a first state, and the second imaging data may be represented as imaging data in a second state.

In the second imaging mode, a difference data between the imaging data in the reference frame and the imaging data in the current frame is obtained. In the case where there is no difference between the imaging data in the reference frame and the imaging data in the current frame, the determination signal TRIG is set to "L", and capturing an image in the second imaging mode is repeated. In contrast, in the case where the presence of a difference is determined, the determination signal TRIG is set to "H", and the mode is switched to the first imaging mode.

After the mode is switched to the first imaging mode again, capturing image is performed once and plurality of times, and then, the mode is switched to the second imaging mode again. The condition of switching from the first imaging mode to the second imaging mode can be determined with reference to the past switching records. For example, the case where the second imaging mode lasts extremely short time period means a case where an image that is being captured changes rapidly; accordingly, it is effective to set a time period of staying in the first imaging mode to be long. Furthermore, the operation of switching to the second imaging mode from the first imaging mode after a predetermined period is effective.

Note that an image-capture frame just before switching from the first imaging mode to the second imaging mode serves as a reference frame in the second imaging mode. Thus, capturing an image in the last image-capture frame in the first imaging mode is performed so that the captured image can be an imaging data in the reference frame in the second imaging mode. In such a manner, power consumption needed for capturing images can be reduced.

Since digital processing such as A/D conversion, which consumes a vast amount of power, is not performed and only minimum analog processing for generating a determination signal TRIG is performed in the second imaging mode, the power consumption can be reduced in the imaging device including pixels $I_{PIX}$ shown in FIG. 1. Furthermore, in the first imaging mode, a cause of generation of a determination signal TRIG, i.e., the difference between the first imaging data and the second imaging data can be checked in detail by digital processing.

Figure 2B:
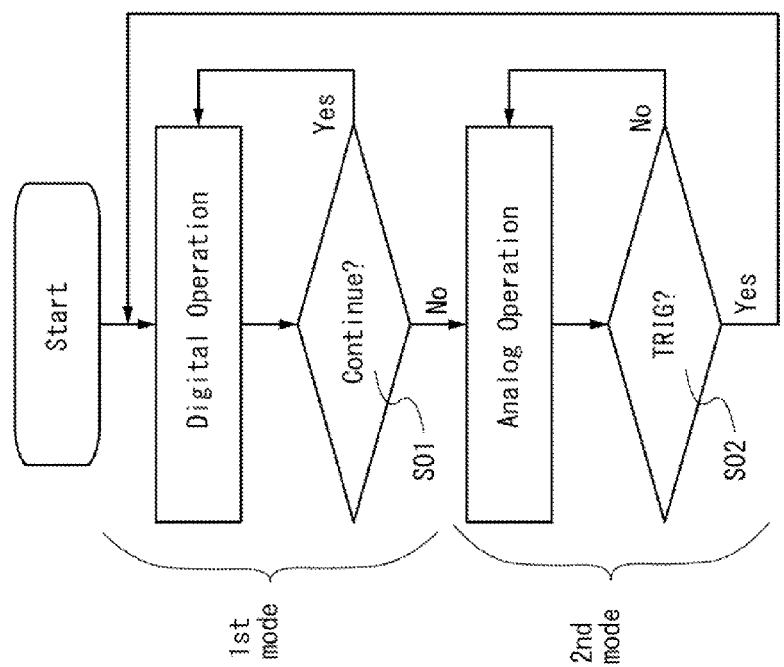

Next, an operation of the first display mode is described (see FIG. 2B). In the first display mode, a video voltage based on an image data output from the imaging device IMAG is applied to display an image. For example, in the display device DISP, a video voltage corresponding to an image data sequentially supplied from the imaging device IMAG is written to the pixel $D_{PIX}$, so that the video voltage that has been written previously is renewed.

Next, an operation of switching the mode from the first display mode to the second display mode is described (see Step S03 in FIG. 2I). This is executable by providing conditions in advance. For example, the conditions are as follows: in the case where the determination signal TRIG is "H", displaying an image in the first display mode is repeated; and in the case where the determination signal TRIG is "L", the mode is switched to the second display mode. In accordance with the conditions, the mode is switched from the first display mode to the second display mode.

In the display device DISP, it is preferable that the mode be switched from the first display mode to the second display mode before the mode of the imaging device IMAG is switched from the first imaging mode to the second imaging mode. With this structure, data DATA from the imaging device IMAG to the display device DISP is not interrupted. Thus, abnormal display of an image can be avoided in the display device DISP.

An operation of the second display mode is described (see FIG. 2B). In the second display mode, an image is displayed only by holding a video voltage written to the pixel $D_{PIX}$ without using an image data output from the imaging device IMAG. For example, in the display device DISP, a video voltage that has been written to the pixel $D_{PIX}$ is hold, so that an image is displayed.

Next, an operation of switching the mode from the second display mode to the first display mode is described (see Step S04 in FIG. 2B). This is executable by setting conditions in advance. For example, the conditions are as follows: in the case where the determination signal TRIG is "L", displaying an image in the second display mode is repeated; and in the case where the determination signal TRIG is "H", the mode is returned to the first display mode. When the conditions are satisfied, the mode is switched from the second display mode to the first display mode.

In the display device DISP, it is preferable that the mode be switched from the second display mode to the first display mode after the mode of the imaging device IMAG is switched from the second imaging mode to the first imaging mode. With this structure, data DATA from the imaging device IMAG to the display device DISP is not interrupted. Thus, abnormal display of an image can be avoided in the display device DISP.

As described above, since digital processing such as A/D conversion, which consumes a vast amount of power, is not performed and only minimum analog processing for generating a determination signal TRIG is performed in the second imaging mode, the power consumption can be reduced in the imaging device including pixels $I_{PIX}$ and the display device DISP including pixels $D_{PIX}$ shown in FIG. 1. With switching to the second image mode, a video signal written to the pixel $D_{PIX}$ is not applied, and the operations of the source driver S_DRV and the gate driver G_DRV can be minimized in the second display mode; thus, power consumption can be reduced. Furthermore, the determination signal TRIG can be obtained by subjecting the difference data stored in the pixel $I_{PIX}$ to analog processing; thus, power consumption can be reduced as compared with a structure in which a difference between the image data is detected by digital processing such as difference processing.

<Structure of Pixel in Imaging Device>

Next, an example of the pixel $I_{PIX}$ included in the imaging device IMAG and an operation thereof are described with reference to FIGS. 4A and 4B and FIG. 5.

Figure 4A:
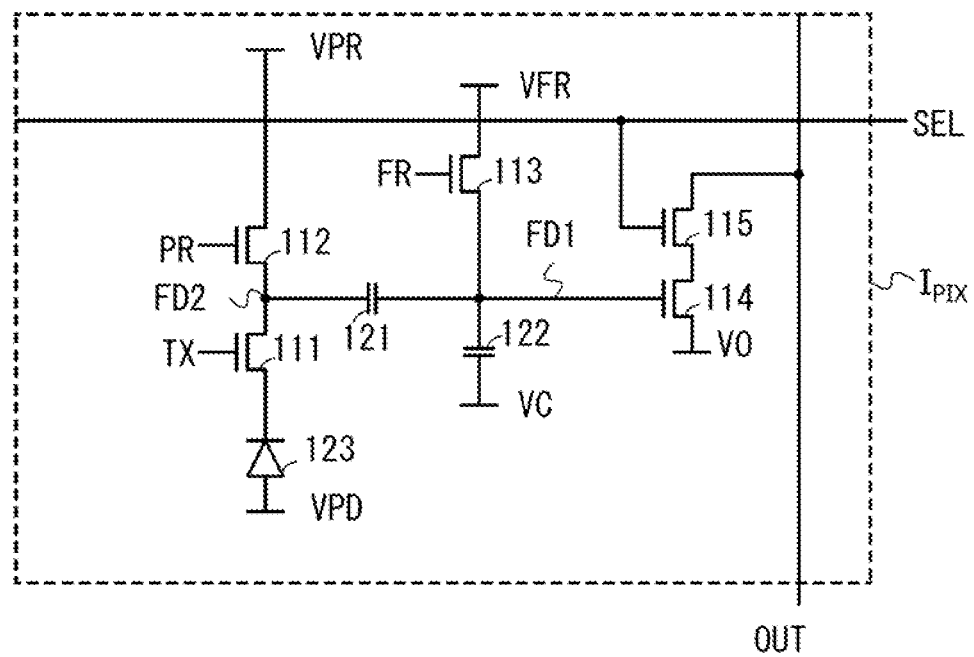
FIGS. 4A and 4B are a circuit diagram and a timing chart for describing one embodiment of the present invention.
Figure 4B:
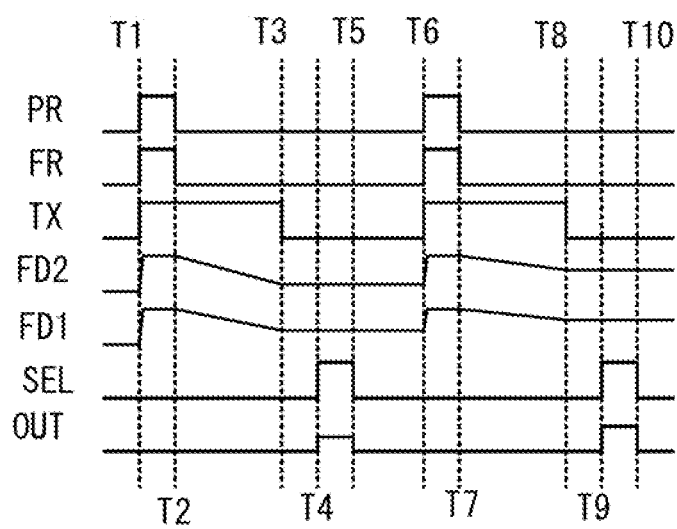

The pixel $I_{PIX}$ shown in FIG. 4A includes transistors 111 to 115, a capacitor 121, a capacitor 122, and a photodiode 123. The pixel $I_{PIX}$ is supplied with potentials from a power supply line VPD, a power supply line VPR, a power supply line VC, a power supply line VFR, and a power supply line VO; and supplied with control signals from a signal line TX, a signal line PR, a signal line FR, and a signal line SEL. Imaging data in the pixel is output from the pixel to a signal line OUT. Charge corresponding to the imaging data is accumulated in a node FD1. Here, the capacitance value of the capacitor 121 is preferably larger than the total capacitance value of the capacitor 122 and the gate capacitance of the transistor 114.

A gate of the transistor 111 is electrically connected to the signal line TX, one of a source and a drain thereof is electrically connected to one terminal of the photodiode 123, and the other of the source and the drain thereof is electrically connected to one of a source and a drain of the transistor 112. A gate of the transistor 112 is electrically connected to the signal line PR, and the other of the source and the drain thereof is electrically connected to the power supply line VPR. A gate of the transistor 113 is electrically connected to the signal line FR, one of a source and a drain thereof is electrically connected to one electrode of the capacitor 122, and the other of the source and the drain thereof is electrically connected to the power supply line VFR. A gate of the transistor 114 is electrically connected to the one electrode of the capacitor 122, one of a source and a drain thereof is electrically connected to the power supply line VO, and the other of the source and the drain thereof is electrically connected to one of a source and a drain of the transistor 115. A gate of the transistor 115 is electrically connected to the signal line SEL, and the other of the source and the drain thereof is electrically connected to the signal line OUT. One electrode of the capacitor 121 is electrically connected to the other of the source and the drain of the transistor III and the one of the source and the drain of the transistor 112, and the other electrode of the capacitor 121 is electrically connected to the one electrode of the capacitor 122 and the one of the source and the drain of the transistor 113. The other electrode of the capacitor 122 is electrically connected to the power supply line VC. The other terminal of the photodiode 123 is electrically connected to the power supply line VPD.

The operation of the pixel $I_{PIX}$ is described with reference to FIG. 4B and FIG. 5. Here, the power supply line VPD is set at a low potential, the power supply line VPR is set at a high potential, the supply line VC is set at a low potential, the power supply line VFR is set at a high potential, and the power supply line VO is set at a high potential, for example.

First, an operation in the first imaging mode is described with reference to FIG. 4B.

From Time T1 to Time T2, the signal line PR, the signal line FR, and the signal line TX are set at "H". In this period, the potential of the node FD1 is set to the potential of the power supply line VFR (represented as V1), and the potential of a node FD2 is set to the potential of the power supply line VPR (represented as V2). From Time T2 to Time T3, the signal line PR and the signal line FR are set at "L", and the signal line TX is set at "H". In this period, the potential of the node FD2 decreases in response to light with which the photodiode 123 is irradiated. Here, when a decreased amount of voltage in the node FD2 is represented as $\Delta V2$, the potential of the node FD2 is represented as $V2-\Delta V2$. The potential of the node FD1 also decreases owing to capacitive coupling of the capacitor 121 (capacitance value C1), and the combined capacitance of the capacitor 122 (capacitance value C2) and the gate capacitance of the transistor 114 (capacitance value Cg). Here, when a decreased amount of charge in the node FD1 is represented as $\Delta V1$, $\Delta V1=\Delta V2 \cdot C1/(C1+C2+Cg)=\Delta V2 \cdot \alpha$, and the potential of the node FD1 is represented as $V1-\Delta V1$. Note that an increase in the intensity of the light with which the photodiode 123 is irradiated reduces the potential of the node FD2. In addition, the potential of the node FD1 decreases. From Time T4 to Time T5, the signal line SEL is set at "H". In this period, a signal corresponding to the imaging data is output to the signal line OUT depending on the potential of the node FD1. Note that a decrease in the potential of the node FD1 reduces the potential of the signal line OUT. That is, an increase in the intensity of the light with which the photodiode 123 is irradiated reduces the potential of the signal line OUT. A period from Time T6 to Time T10 can be explained in a manner similar to that for the period from Time T1 to Time T5.

Next, an operation in the second imaging mode is described with reference to FIG. 5.

A time period from Time T01 to Time T06 corresponds to a period for obtaining an imaging data in the reference frame. From Time T01 to Time T02, the signal line PR, the signal line FR, the signal line TX are set at "H". In this period, the potential of the node FD1 is set to the potential of the power supply line VFR (represented as V1), and the potential of a node FD2 is set to the potential of the power supply line VPR (represented as V2). From Time T2 to Time T3, the signal line PR is set at "L", and the signal line TX and the signal line FR are set at "H". In this period, the potential of the node FD2 decreases in response to light with which the photodiode 123 is irradiated. Here, when a decreased amount of voltage in the node FD2 is represented as ΔV2, the potential of the node FD2 is represented as V2−ΔV2. Note that an increase in the intensity of the light with which the photodiode 123 is irradiated reduces the potential of the node FD2. Note that the potential of the node FD1 does not change. From Time T03 to Time T04, the signal line PR and the signal line FR are set at "L", and the signal line TX is set at "H". An interval between Time T02 and Time T03 and an interval between Time T03 and Time T04 are equivalent to each other and each represented by T. In this period, the potential of the node FD2 decreases in response to light with which the photodiode 123 is irradiated, which can be represented as V2−2·ΔV2. Furthermore, owing to the capacitive coupling of the capacitor 121, the capacitor 122, and gate capacitance of the transistor 114, the potential of the node FD1 is also decreased. Here, when a decreased amount of charge in the node FD is represented as ΔV1, ΔV1=ΔV2·α, and the potential of the node FD1 is represented as V1−ΔV1. Note that an increase in the intensity of the light with which the photodiode 123 is irradiated reduces the potential of the node FD2. In addition, the potential of the node FD1 is also decreased. Note that the interval between Time T02 and Time T03 and the interval between Time T03 and Time T04 are T and equivalent to each other as described above. Practically, it is important to set the decreased amount of the node FD2 from Time T02 to Time 03 and the decreased amount of the node FD2 from Time T03 to Time T04 to be equal to each other. Accordingly, it is preferable that the interval between Time T02 and Time T03 and the interval Time T03 and Time T04 be adjusted as appropriate so that the above conditions are satisfied. From Time T05 to Time T06, the signal line SEL is set at "H". In this period, a signal corresponding to the imaging data is output to the signal line OUT depending on the potential of the node FD1. Note that a decrease in the potential of the node FD1 reduces the potential of the signal line OUT. That is, an increase in the intensity of the light with which the photodiode 123 is irradiated reduces the potential of the signal line OUT.

A time period from Time T11 to Time T15 corresponds to a period for obtaining a difference data by capturing an image data in a current frame. In particular, the period corresponds to a period in which a difference between the first imaging data and the second imaging data is zero. From Time T11 to Time T12, the signal line PR is set at "H", the signal line FR is set at "L", and the signal line TX is set at "H". In this period, the potential of the node FD2 is set to the potential of the power supply line VPR (V2). That is, the potential is increased by a decreased amount of voltage in the period from Time T02 to Time T04 (2·ΔV2). On the other hand, although the potential of the node FD1 also increases owing to the capacitive coupling of the capacitor 121, the capacitor 122, and the gate capacitance of the transistor 114, the increased amount of potential (2·ΔV1) is equivalent to twice the decreased amount of voltage in the period from Time 03 to Time T04. That is the increased amount of potential is a potential (V1+ΔV1), which is equivalent to the sum of the potential of the power supply line VFR (V1) and the decreased amount of voltage in the period from Time T03 to Time T 04 (ΔV1). From Time T12 to Time T13, the signal line PR and the signal line FR are set at "L", and the signal line TX is set at "H". In this period, the potential of the node FD2 decreases in response to light with which the photodiode 123 is irradiated. In addition, the potential of the node FD decreases due to coupling capacitance of the capacitor 121, the capacitor 122, and the gate capacitance of the transistor 114. Note that an increase in the intensity of the light with which the photodiode 123 is irradiated reduces the potential of the node FD2. Furthermore, the potential of the node FD1 decreases.

Assuming that an interval between Time T12 and Time T13 is T and the intensity of light with which the photodiode 123 is irradiated is the same as that from Time T02 to Time T04, the decreased amount of voltage in the node FD2 in the period from Time T12 to Time T13 is equal to the decreased amount of voltage ΔV2 in the period from Time T03 to Time T04. Furthermore, the decreased amount of voltage in the node FD1 in the period from Time T12 to Time T13 is equal to the decreased amount of voltage ΔV1 in the period from Time T03 to Time T04. Therefore, the potential of the node FD1 is V1, which indicates that the difference between the first imaging data and the second imaging data is zero. Note that the potential of the node FD1 corresponds to a difference data stored in the pixel $I_{PIX}$.

From Time 14 to Time T15, the signal line SEL is set at "H". In this period, a signal corresponding to the imaging data is output to the signal line OUT depending on the potential of the charge retention node FD1. Note that the potential of the signal is a potential at which the difference between the first image data and the second image data is zero. The potential of a signal output from the signal line OUT is a potential corresponding to a difference data stored in the node FD1.

A period from Time T21 to Time T25 corresponds to a period for obtaining the second imaging data in the second state. In particular, in a manner similar to that of the period from Time T11 to Time T15, the period corresponds to a period in which a difference between the first imaging data and the second imaging data is zero.

A time period from Time T31 to Time T35 corresponds to a period for obtaining the second imaging data in the second state. In particular, the period corresponds to a period in which a difference between the first imaging data and the second imaging data is finite (negative). From Time T31 to Time T32, the signal line PR is set at "H", the signal line FR is set at "L", and the signal line TX is set at "H". In this period, the potential of the node FD2 is set to the potential of the power supply line VPR (V2). That is, the potential is increased by a decreased amount of voltage in the period from Time T12 to Time T13 (ΔV2). In contrast, although the potential of the node FD1 also increases owing to the capacitive coupling of the capacitor 121, the capacitor 122, and the gate capacitance of the transistor 114, the increased amount of potential (ΔV1) is equivalent to the decreased amount of voltage in the period from Time 12 to Time T13. That is the increased amount of potential is a potential (V1+ΔV1), which is equivalent to the sum of the potential of the power supply line VFR (V1) and the decreased amount of voltage in the period from Time T03 to Time T 04 (ΔV1). From Time T32 to Time T33, the signal line PR and the signal line FR are set at "L", and the signal line TX is set at "H". In this period, the potential of the node FD2 decreases in response to light with which the photodiode 123 is irradiated. Furthermore, the potential of the node FD1 decreased owing to the capacitive coupling of the capacitor 121, the capacitor 122, and the gate capacitance of the transistor 114. Note that the intensity of light with which the photodiode 123 is irradiated in the period from Time T32 to Time T33 is assumed to be higher than that in the period from Time T12 to Time T13. Here, when the interval between Time T32 and Time T33 is T, a decreased amount of voltage in the node FD2 ($\Delta V2'$) is larger than the decreased amount of voltage ($\Delta V2$) in the period from Time T12 to Time T13 ($\Delta V2' > \Delta V2$). Furthermore, the decreased amount of voltage in the charge retention node FD1 ($\Delta V1' = \Delta V2' \cdot \alpha$) is also larger than the decreased amount of voltage ($\Delta V1$) in the period from Time T12 to Time T13 ($\Delta V1' > \Delta V1$). As a result, the potential of the node FD1 ($V1 + \Delta V1 - \Delta V1'$) is lower than the potential of the supply line VFR ($V1$), which indicates that the difference between the first imaging data and the second imaging data is finite (negative).

From Time T34 to Time T35, the signal line SEL is set at "H". In this period, a signal corresponding to the imaging data is output to the signal line OUT depending on the potential of the charge retention node FD1. Note that the potential of the signal is a potential which is lower than the potential of the signal in a period from Time T24 to Time T25 and at which the difference between the first image data and the second image data is finite (negative).

A period from Time T41 to Time T45 corresponds to a period for obtaining the second imaging data in the second state. In particular, the period corresponds to a period in which a difference between the first imaging data and the second imaging data becomes zero again. From Time T41 to Time T42, the signal line PR is set at "H", the signal line FR is set at "L", and the signal line TX is set at "H". In this period, the potential of the node FD2 is set to the potential of the power supply line VPR ($V2$). That is, the potential is increased by a decreased amount of voltage in the period from Time T32 to Time T33 ($\Delta V2'$). In contrast, although the potential of the node FD1 also increases owing to the capacitive coupling of the capacitor 121, the capacitor 122, and the gate capacitance of the transistor 114, the increased amount of potential ($\Delta V1'$) is equivalent to the decreased amount of voltage in the period from Time 32 to Time T33. That is the increased amount of potential is a potential ($V1 + \Delta V1$), which is equivalent to the sum of the potential of the power supply line VFR ($V1$) and the decreased amount of voltage in the period from Time T03 to Time T04 ($\Delta V1$). From Time T42 to Time T43, the signal line PR and the signal line FR are set at "L", and the signal line TX is set at "H". In this period, the potential of the node FD2 decreases in response to light with which the photodiode 123 is irradiated. The node FD1 decreases owing to the capacitive coupling of the capacitor 121, the capacitor 122, and the gate capacitance of the transistor 114. Note that an increase in the intensity of the light with which the photodiode 123 is irradiated reduces the potential of the node FD2. Note that an increase in the intensity of the light with which the photodiode 123 is irradiated reduces the potential of the node FD2. Furthermore, the potential of the charge retention node FD1 also decreases. Assuming that an interval between Time T42 and Time T43 is T and the intensity of light with which the photodiode 123 is irradiated is the same as that from Time T02 to Time T04, the decreased amount of voltage in the node FD2 in the period from Time T42 to Time T43 is equal to the decreased amount of voltage $\Delta V2$ in the period from Time T03 to Time T4. Furthermore, the decreased amount of voltage in the node FD1 in the period from Time T42 to Time T43 is equal to the decreased amount of voltage $\Delta V1$ in the period from Time T03 to Time T04. Therefore, the potential of the node FD1 is $V1$, which indicates that the difference between the first imaging data and the second imaging data is zero. From Time T44 to Time T45, the signal line SEL is set at "H". In this period, a signal corresponding to the imaging data is output to the signal line OUT depending on the potential of the node FD1. Note that the potential of the signal is a potential at which the difference between the first image data and the second image data is zero.

A period from Time T51 to Time T55 corresponds to a period for obtaining the second imaging data in the second state. In particular, the period corresponds to a period in which a difference between the first imaging data and the second imaging data is finite (positive). From Time T51 to Time T52, the signal line PR is set at "H", the signal line FR is set at "L", and the signal line TX is set at "H". In this period, the potential of the node FD2 is set to the potential of the power supply line VPR ($V2$). That is, the potential is increased by a decreased amount of voltage in the period from Time T42 to Time T43 ($\Delta V2$). In contrast, although the potential of the node FD1 also increases owing to the capacitive coupling of the capacitor 121, the capacitor 122, and the gate capacitance of the transistor 114, the increased amount of potential ($\Delta V1$) is equivalent to the decreased amount of voltage in the period from Time 42 to Time T43. That is the increased amount of potential is a potential ($V1 + \Delta V1$), which is equivalent to the sum of the potential of the power supply line VFR ($V1$) and the decreased amount of voltage in the period from Time T03 to Time T04 ($\Delta V1$).

From Time T52 to Time T53, the signal line PR and the signal line FR are set at "L", and the signal line TX is set at "H". In this period, the potential of the node FD2 decreases in response to light with which the photodiode 123 is irradiated. The potential of the node FD1 decreases owing to the capacitive coupling of the capacitor 121, the capacitor 122, and the gate capacitance of the transistor 114. Note that the intensity of light with which the photodiode 123 is irradiated in the period from Time T52 to Time T53 is assumed to be lower than that in the period from Time T12 to Time T13.

Here, when the interval between Time T52 and Time T53 is T, a decreased amount of voltage in the node FD2 ($\Delta V2''$) is smaller than the decreased amount of voltage ($\Delta V2$) in the period from Time T12 to Time T13 ($\Delta V2'' < \Delta V2$). Furthermore, the decreased amount of voltage in the node FD1 ($\Delta V1'' = \Delta V2'' \cdot \alpha$) is also smaller than the decreased amount of voltage ($\Delta V1$) in the period from Time T12 to Time T13 ($\Delta V1''' < \Delta V1$). As a result, the potential of the charge retention node FD1 ($V1 + \Delta V1 - \Delta V1'$) is higher than the potential of the supply line VFR ($V1$), which indicates that the difference between the first imaging data and the second imaging data is finite (positive).

From Time T54 to Time T55, the signal line SEL is set at "H". In this period, a signal corresponding to the imaging data is output to the signal line OUT depending on the potential of the node FD1. Note that the potential of the signal is a potential which is higher than the potential of the signal in the period from Time T24 to Time T25 and at which the difference between the first imaging data and the second imaging data is finite (positive).

Note that the first imaging data is output from Time T05 to T06 in this embodiment; however, in the case where it is enough to obtain difference data between the first imaging data and the second imaging data, that is, in the case where the first imaging data need not be output, the operations from Time T03 to Time T06 can be skipped. Operations in which the operations from Time T03 to Time T06 are skipped are as follows. When the signal line PR is set at "H", the signal line FR is set at "L", and the signal line TX is set at "H" from Time T11 to Time T12, the potential of the node FD2 is changed from the potential V2−ΔV2 at Time T03 to the potential V2. Furthermore, the potential of the node FD1 is increased from the potential V1 at the Time T03 to the potential V1+ΔV1. For operations after Time T12, the above description can be referred to.

With the above structure, the pixel $I_{PIX}$ can obtain the imaging data by capturing an image, and store and output a difference data between an imaging data in a reference frame and an imaging data in a current frame.

Figure 17A:
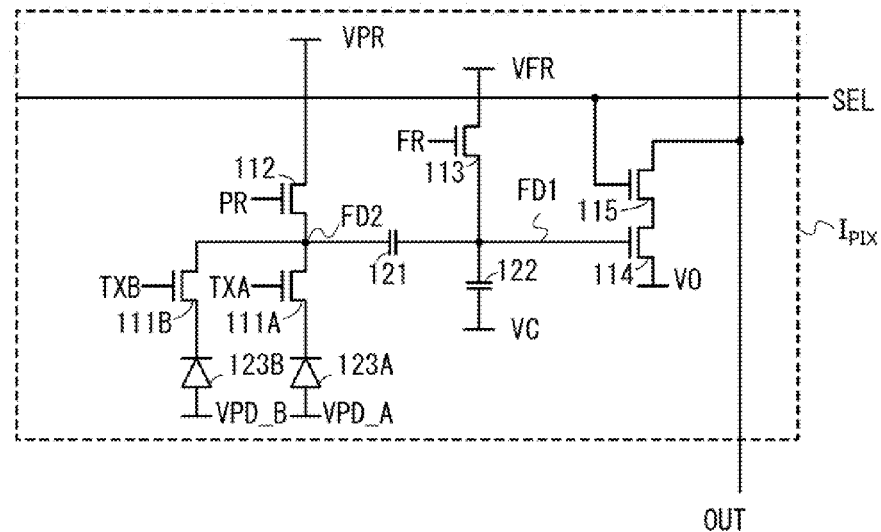
FIGS. 17A and 17B are circuit diagrams each showing one embodiment of the present invention.

As the transistor 111 and the photodiode 123 shown in FIG. 4A, plural number of transistors and plural number of photodiodes may be provided. For example, the pixel $I_{PIX}$ may have a such a structure, as shown in FIG. 17A, that a photodiode 123A and a photodiode 123B are provided, a signal line TXA is connected to a gate of a transistor 111A, and a signal line TXB is connected to a gate of the transistor 111B. Alternatively, the pixel $I_{PIX}$ may have such a structure, as shown in FIG. 17B, that photodiodes 123A to 123C are provided, the signal line TXA is connected to the gate of the transistor 111A, the signal line TXB is connected to the gate of the transistor 111B, and a signal line TXC is connected to a gate of the transistor 111C.

Figure 17B:
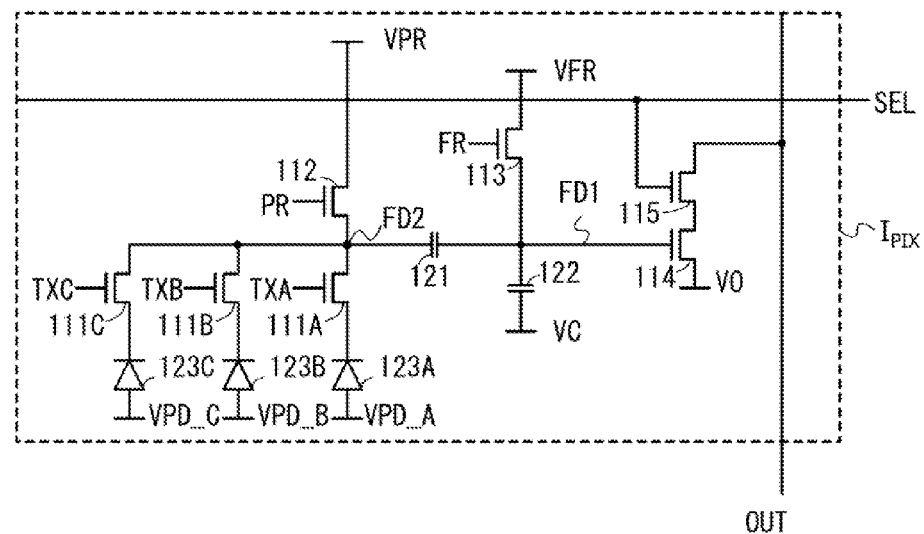
Figure 18A:
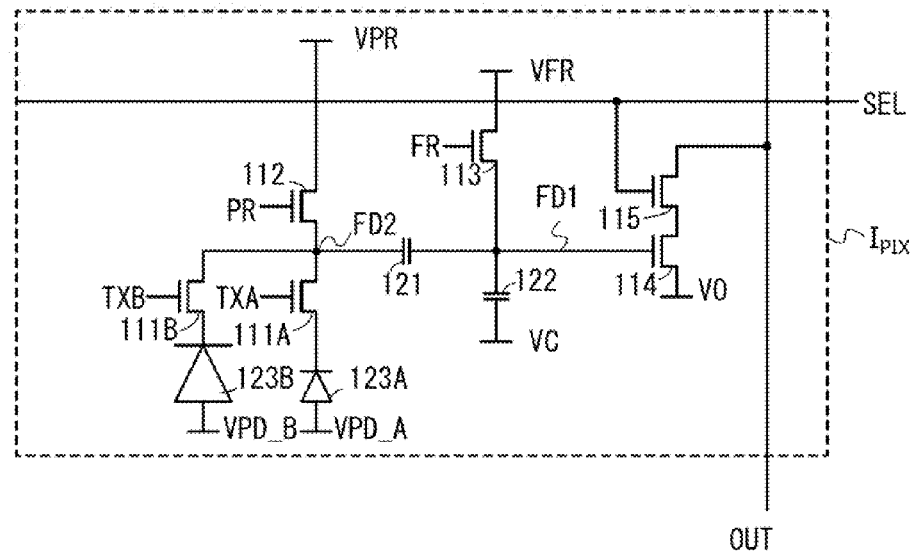
FIGS. 18A and 18B are circuit diagrams each showing one embodiment of the present invention.
Figure 18B:
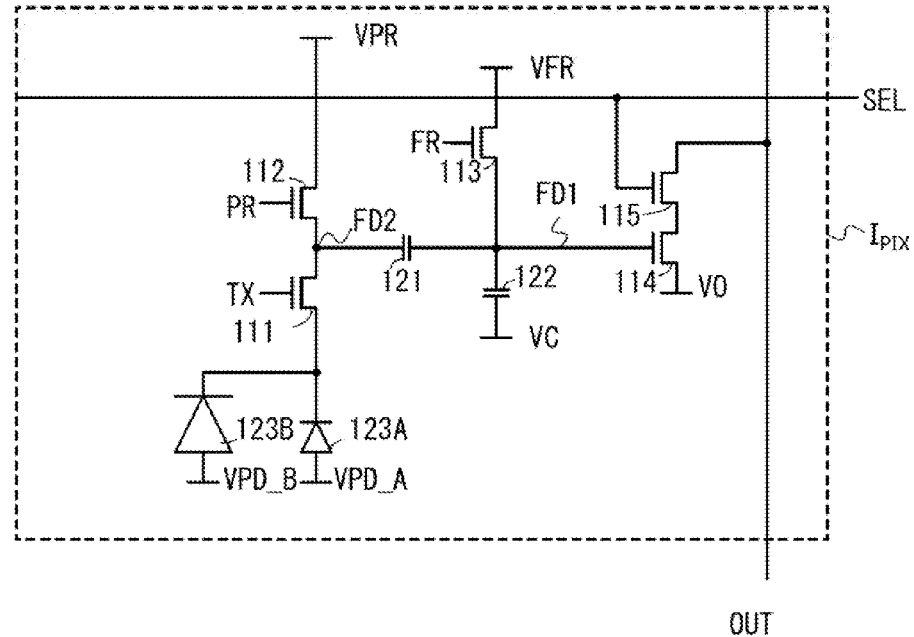

Note that in the case where a plurality of photodiodes are provided as in FIGS. 17A and 17B, elements having different light-receiving areas of the photodiodes from each other may be provided. In this case, the pixel $I_{PIX}$ may have a structure, as shown in FIG. 18A, such that the photodiode 123A and the photodiode 123B, which have light-receiving areas with different sizes from each other, are provided to be connected to respective transistors. Note that the photodiode 123A is connected to a power supply line VPD_A, and the photodiode 123B is connected to a power supply line VPD_B. The power supply line VPD_A and the power supply line VPD_B may have the same potential or different potentials. Alternatively, the pixel $I_{PIX}$ may have a structure, as shown in FIG. 18B, such that the photodiode 123A and the photodiode 123B, which have light-receiving areas with different sizes, are provided to be connected to one transistor 111. With either of a structure shown in FIG. 18A and a structure shown in FIG. 18B, photodiodes with different spectral sensitivity are provided, so that images of places under different brightness can be concurrently captured. To make spectral sensitivity of photodiodes to be difference, the photodiodes may be formed to have different sizes of light-receiving areas, or different kinds of semiconductor materials may be provided in the light-receiving areas.

Figure 19:
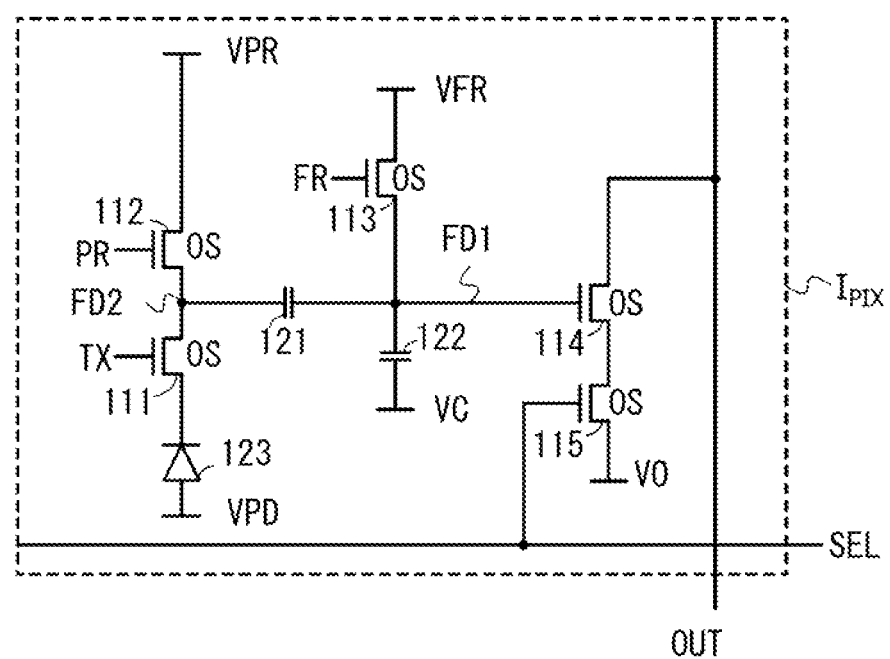
FIG. 19 is a circuit diagram showing one embodiment of the present invention.

Although the operation in which the current through the transistor 114 flows from the power supply line VO to the signal line OUT is described in FIG. 4A, the direction of current flow may be opposite to the above direction. In other words, a circuit configuration in which the current through the transistor 114 flows from the signal line OUT to the power supply line VO may be employed. In this case, for example, a circuit configuration of the pixel $I_{PIX}$ shown in FIG. 19 may be employed. Note that in the circuit configuration of the pixel $I_{PIX}$ shown in FIG. 19, a low potential may be supplied to the power supply line VO, and a high potential is supplied to the signal line OUT.

Figure 20A:
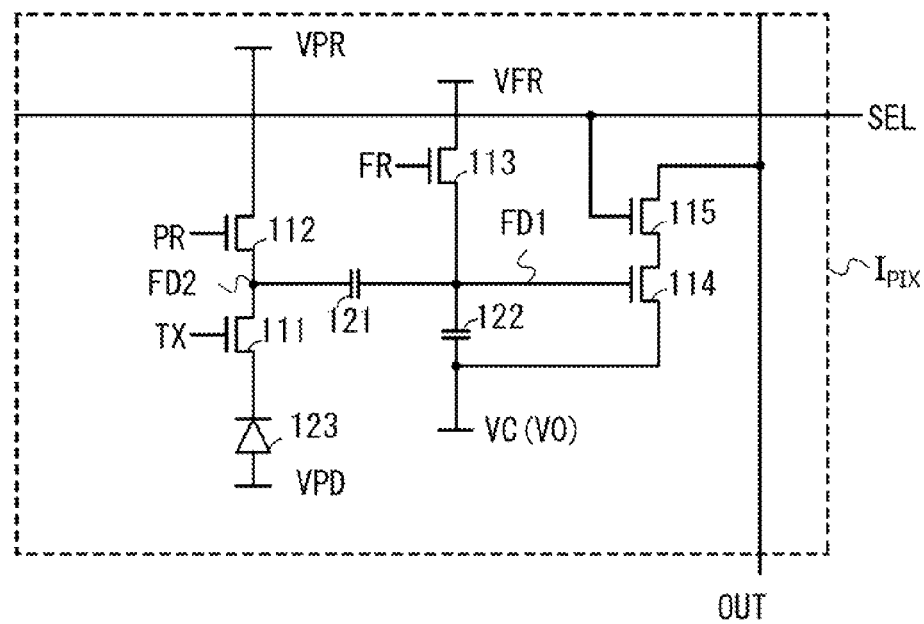
FIGS. 20A and 20B are circuit diagrams each showing one embodiment of the present invention.
Figure 20B:
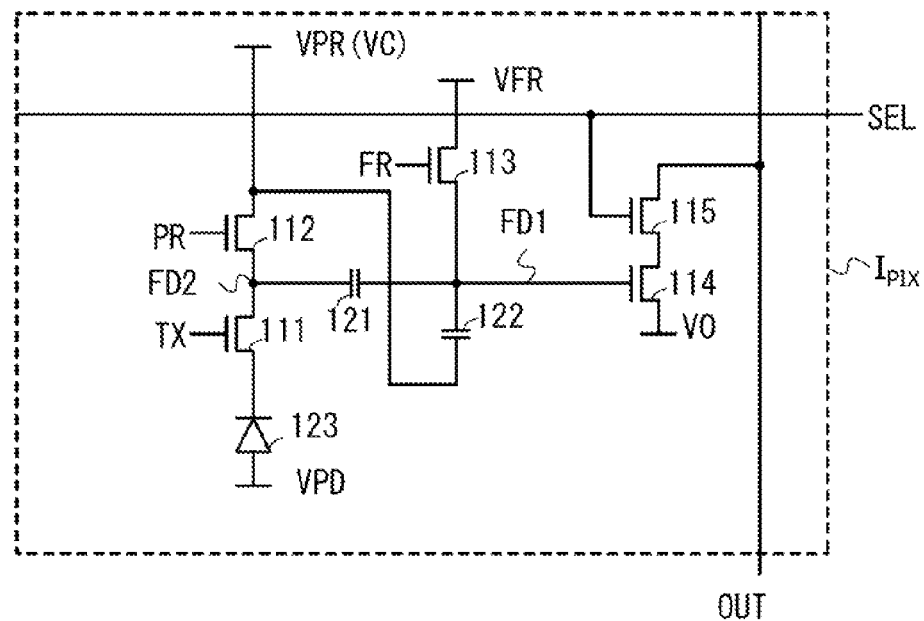
Figure 21A:
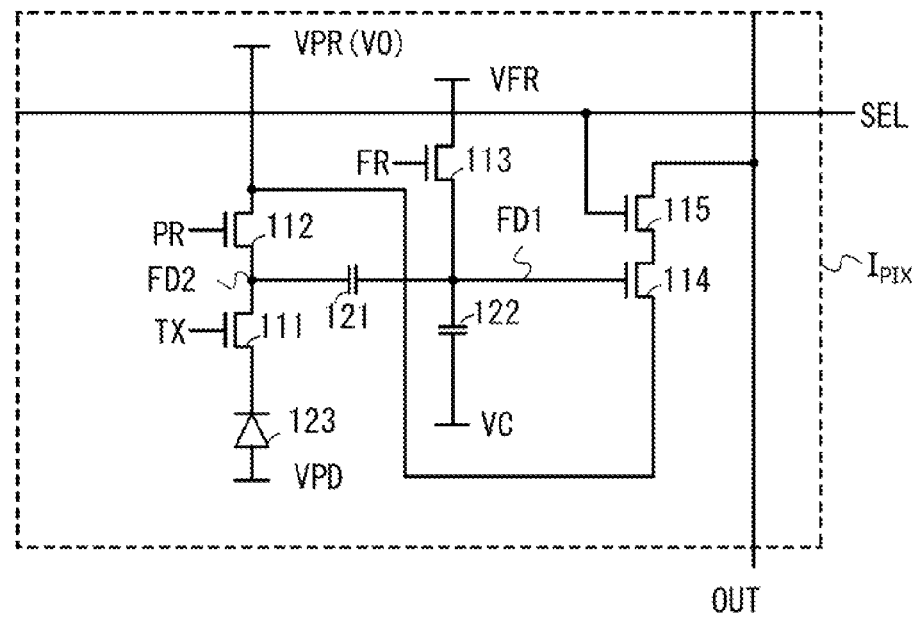
FIGS. 21A and 21B are circuit diagrams each showing one embodiment of the present invention.
Figure 21B:
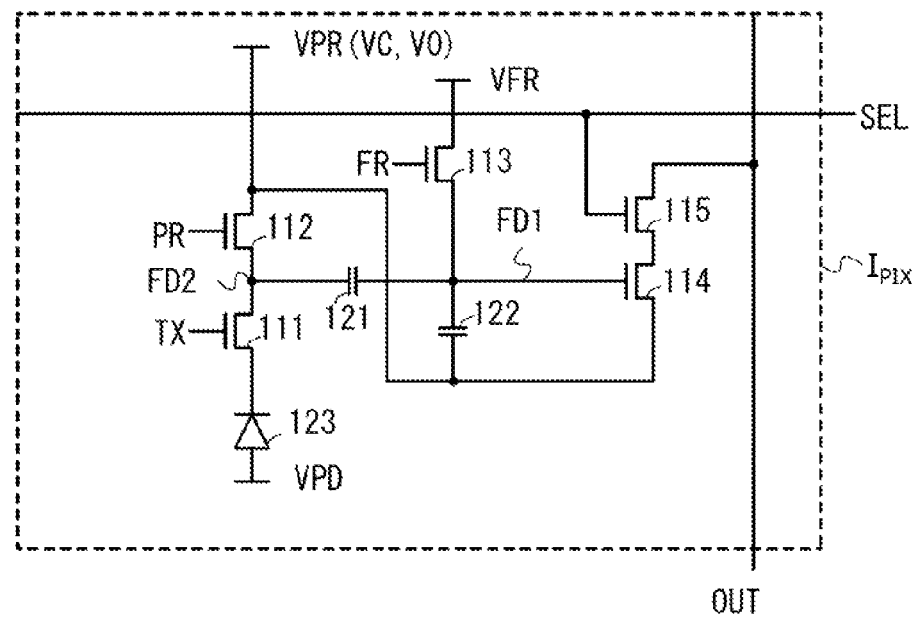

Although in FIG. 4A, wirings supplying the same potential are shown as different wirings, one wiring may serve as those wirings. For example, as shown in the pixel $I_{PIX}$ in FIG. 20A, the power supply line VC and the power supply line VO each of which supplies a high potential may be provided as one wiring. Alternatively, as shown in pixel $I_{PIX}$ in FIG. 20B, the power supply line VPR and the power supply line VC each of which supplies a high potential may be provided as one wiring. Further alternatively, as shown in the pixel $I_{PIX}$ in FIG. 21A, the power supply line VPR and the power supply line VO each of which supplies a high potential may be provided as one wiring. Further alternatively, as shown in the pixel $I_{PIX}$ in FIG. 21B, the power supply line VPR, the power supply line VC, and the power supply line VO each of which supplies a high potential may be provided as one wiring.

With the above structure, one embodiment of the present invention can achieve a display system with a novel structure in which a determination signal for newly applying a video signal is generated with a simple structure without a digital processing such as a difference processing, and consumed power can be reduced by reducing the frequency of applying a video voltage.

<Configuration of Analog Processing Circuit>

Next, one example of a configuration of the analog processing circuit Analog included in the imaging device IMAG is described with reference to FIG. 6, FIG. 7, and FIG. 8. In this embodiment, two possible circuit configurations which the analog processing circuit Analog may have are described.

Figure 6:
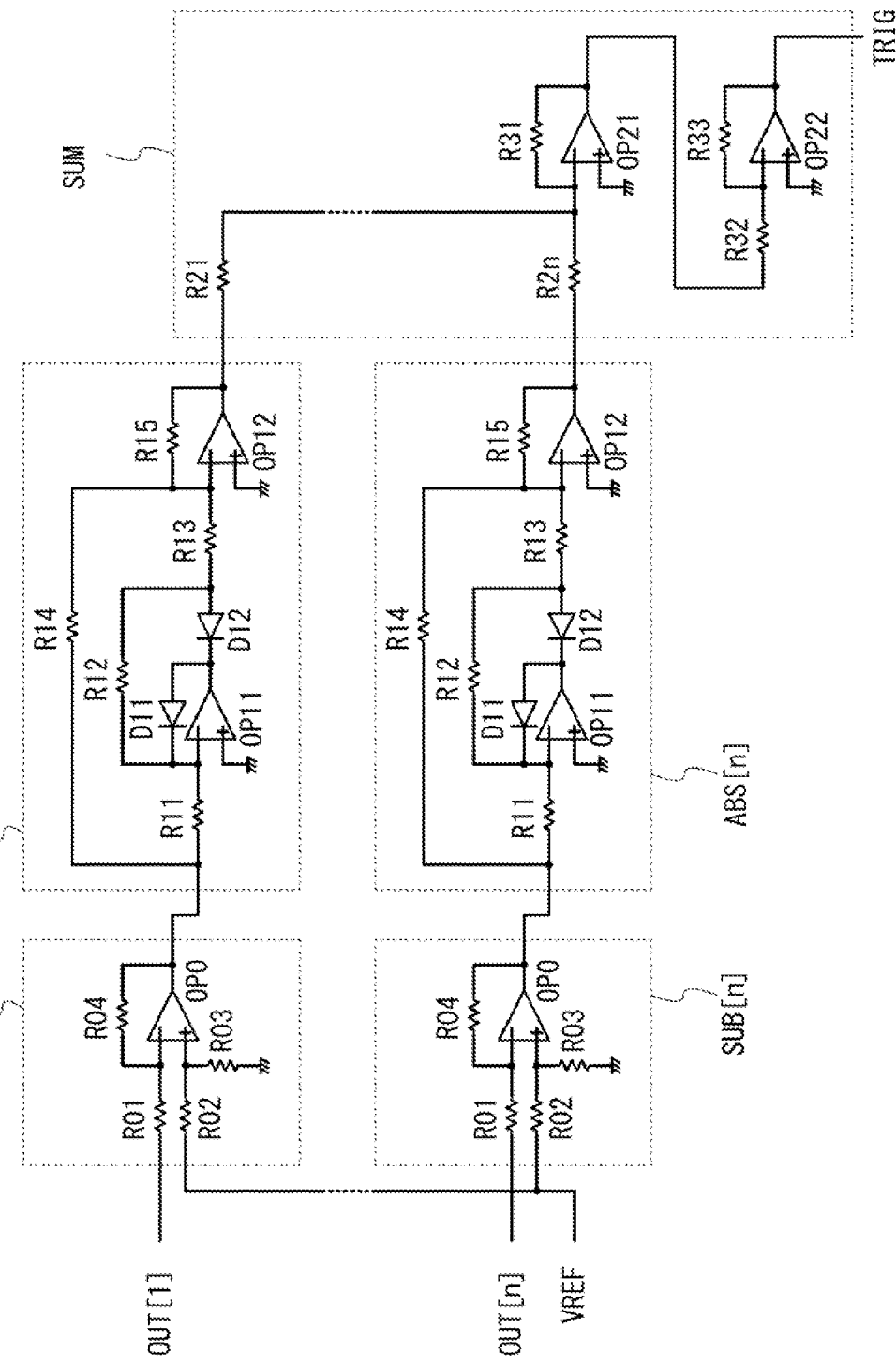
FIG. 6 is a circuit diagram showing one embodiment of the present invention.
Figure 7:
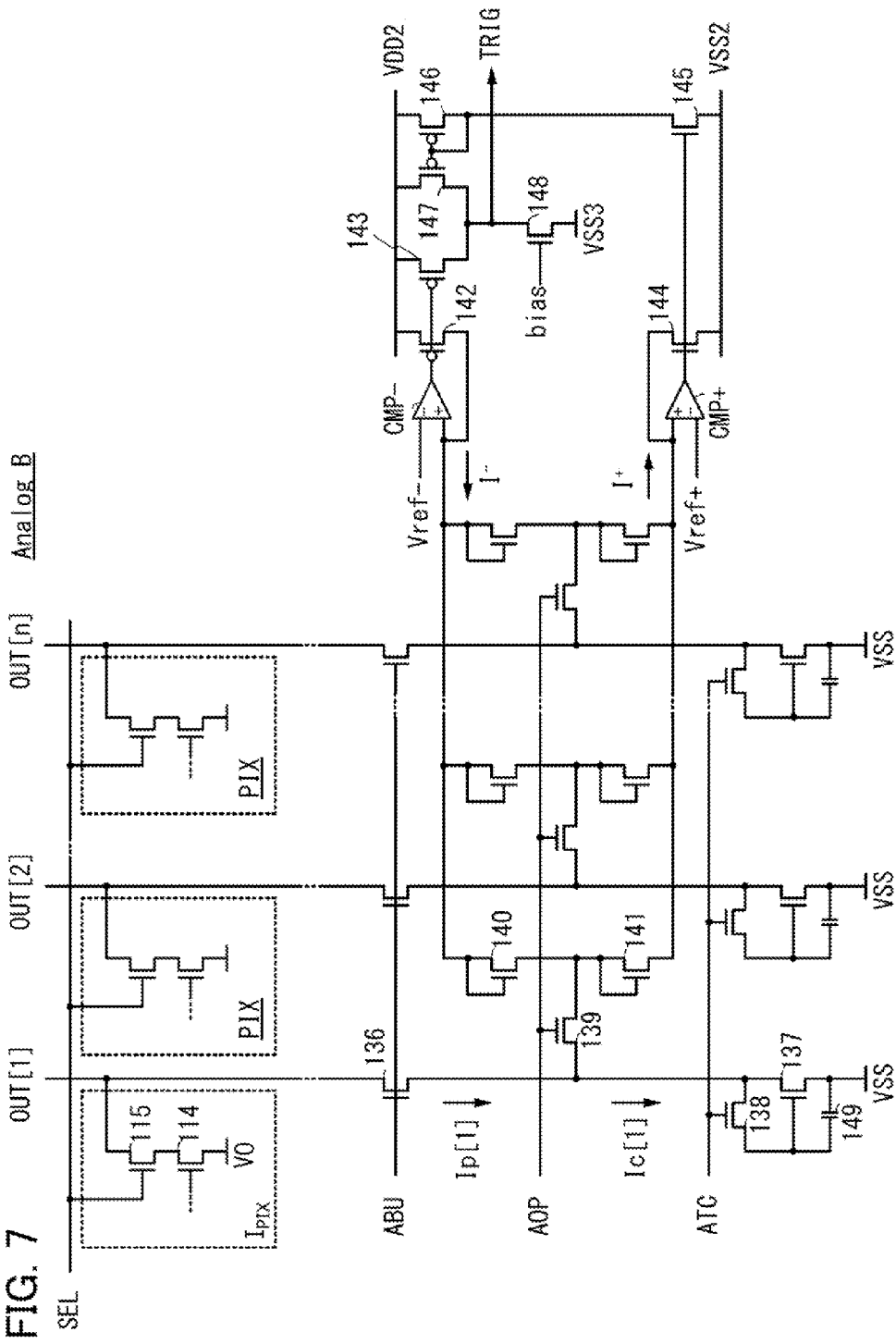
FIG. 7 is a circuit diagram showing one embodiment of the present invention.

First, with FIG. 6, an analog processing circuit Analog_A is described.

The analog processing circuit Analog_A includes subtraction circuits SUB[1] to SUB[n], absolute value circuits ABS[1] to ABS[n], and an adder circuit SUM.

The subtraction circuits SUB[1] to SUB[n] perform subtraction of potentials of signal lines OUT[1] to OUT[n] of pixels from a reference potential VREF, respectively. The reference potential VREF can be generated by providing a dummy circuit equivalent to the pixel $I_{PIX}$ and using the potential of its signal line OUT when the potential of its node FD1 is VFR. The subtraction circuits SUB[1] to SUB[n] each include an OP amplifier OP0 and resistors R01 to R04. Here, in the subtraction circuit SUB[1], the potential of the signal line OUT[1] and the potential of VREF are represented as V10 and V20, respectively. In addition, the resistance values of the resistors R01 to R04 are set so as to satisfy the following formulae (1) and (2).

$$R01 = R04 \qquad (1)$$

$$R04/R01 = R03/R02 \qquad (2)$$

Thus, the output of the subtraction circuit SUB[1] satisfies the following formula (3).

$$V0 = V20 - V10 \qquad (3)$$

Note that the same applies to the outputs of the subtraction circuits SUB[2] to SUB[n].

The absolute value circuits ABS[1] to ABS[n] output the absolute values of the outputs of the subtraction circuits SUB[1] to SUB[n], respectively. The absolute value circuits ABS[1] to ABS[n] each include an OP amplifier OP11, an OP amplifier OP12, resistors R11 to R15, a diode D11, and a diode D12. Here, in the absolute value circuit ABS[1], the potential of an input signal is represented as V10', and the resistance values are set so that R11=R12 and R13×2=R14=R15, whereby the output of the absolute value circuit ABS[1] is equal to V0'=|V10'|.

Note that the same applies to the outputs of the absolute value circuit ABS[1] to ABS[n].

The adder circuit SUM outputs the sum of the outputs of the absolute value circuits ABS[1] to ABS[n]. The adder circuit SUM includes an OP amplifier OP21, an OP amplifier OP22, resistors R21 to R2n, and resistors R31 to R33. Here, when the potentials of the outputs of the absolute value circuits ABS[1] to ABS[n] are represented as V10" to Vn0", respectively, and the resistance values are set so that R21= ... =R2n=R31 and R32=R33, the output of the adder circuit SUM is equal to V10"+ ... +Vn0". This is regarded as a determination signal TRIG when the first imaging data is the same as the second imaging data, the determination signal TRIG is "L". In contrast, when the first imaging data is different from the second imaging data, the determination signal TRIG is "H".

Next, an analog processing circuit Analog_B is described with reference to FIG. 7.

The analog processing circuit includes transistors 136, 137, 138, 139, 140, 141, 142, 143, 144, 145, 146, 147, and 148, a capacitor 149, a comparator CMP+, and a comparator CMP−. The potential of a reference potential line Vref+ and the potential of a reference potential supply line Vref− are set appropriately.

Figure 8:
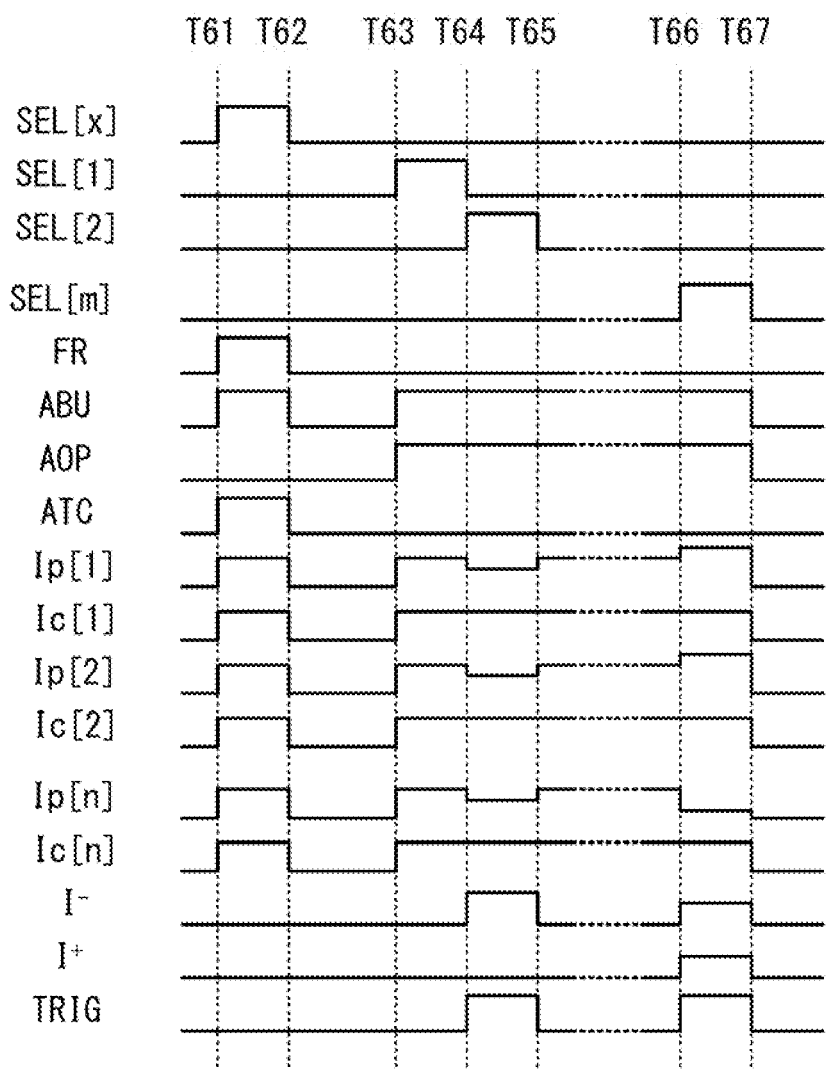
FIG. 8 is a timing chart for describing one embodiment of the present invention.

FIG. 8 is a timing chart showing an operations of the analog processing circuit Analog_B.

From Time T61 to Time T62, a signal line ABU is set at "H", a signal line AOP is set at "L", and a signal line ATC is set at "H". Furthermore, the signal line FR and a signal line SEL[x] are set at "H". Note that the signal line SEL[x] is the signal line SEL in an arbitrary row (the x-th row, x is a natural number less than or equal to m). At this time a current supplied to the signal line OUT[y] in a y-th column (y is a natural number less than or equal to n) is equal to a current value at the time when the gate potential of the transistor 114 in each pixel PIX in the x-th row is VFR, i.e., an amount of current I0[y] at the time when the difference between imaging data in a reference frame and imaging data in a current frame is zero. The amount of current I0[y] may be referred also as a reference current amount (of the y-th column). Although the current amounts I0[1] to I0[n], each corresponding to the reference current amount of each column, are not always equal, each value of the current amounts I0[1] to I0[n] does not directly affect the operation of the analog processing circuit as shown below. Accordingly, each of the current amounts I0[1] to I0[n] is written as a current amount I0 hereinafter.

Currents Ip[1] to Ip[n] flowing through the transistors 136 are equal to the current value I0, and currents Ic[1] to Ic[n] are also equal to the current value I0. Furthermore, a value of current flowing to the transistor 137 in which the drain and the gate are connected each other via the transistor 138 is equal to the current value I0. In particular, a potential charged in the capacitor 149 is set to a potential corresponding to a gate voltage which is necessary for the current value I0 to flow.

From Time T63 to Time T64, the signal line ABU is set at "H", the signal line AOP is set at "H", the signal line ATC is set at "L", and the signal line SEL[1] is set at "H". In the period, a current corresponding to difference data of each pixel in the first row is supplied to each of the signal lines OUT[1] to OUT[n] in the respective columns. Here, when the difference data of each pixel in the first row is zero, values of currents supplied to the signal lines OUT[1] to OUT[n] in the respective columns, values of currents Ip[1] to Ip[n] flowing through the transistors 136, and values of currents Ic[1] to Ic[n] are equal to the amount of current I0.

From Time T64 to Time T65, the signal line ABU is set at "H", the signal line AOP is set at "H", the signal line ATC is set at "L", and the signal line SEL[2] is set at "H". In the period, a current corresponding to difference data of each pixel in the second row is supplied to each of the signal line OUT[1] to OUT[n] in the respective columns. Here, when the difference data of each pixel in the second row is finite (negative) and a value of current supplied to the signal lines OUT[v] in the v-th column is represented as (I0−ΔIv), the current Ip[v] flowing through the transistors 136 of the v-th column are equal to (I0−ΔIv), and the currents Ic[v] are equal to the amount of current I0; therefore, a current ΔIv flows through the transistor 139 and the transistor 140 of the v-th column.

Here, in order that current with current values ΔI1 to ΔIn flow in the transistors 140) in the corresponding columns, current with a current value I⁻ corresponding to the sum of them needs to be supplied. Here, owing to the comparator CMP− and the transistor 142, the current I⁻ is supplied. That is, in the case where the sum of the current supplied to the transistor 140 in each column through the transistor 142 is smaller (larger) than the current I⁻, the potential of a + terminal of the comparator CMP− decreases (increases), and thus, the output of the comparator CMP− decreases (increases). That is, the gate voltage of the transistor 142 decreases (increases); as a result, it becomes possible to supply a larger (smaller) current I⁻.

Furthermore, since a potential which is equal to the potential of the gate of the transistor 142 is applied to the transistor 143, a current n1·I⁻ obtained by multiplying the current I⁻ by n1, the W/L ratio of the transistor 143 to the transistor 142, flows in the transistor 143. Furthermore, owing to a buffer formed using the transistor 148 and the transistor 143, the signal TRIG is set at "H". Note that a bias voltage bias is applied to the gate of the transistor 148. The bias voltage bias can be adjusted as appropriate.

From Time T66 to Time T67, the signal line ABU is set at "H", the signal line AOP is set at "H", the signal line ATC is set at "L", and the signal line SEL[m] is set at "H". In the period, a current corresponding to difference data of each pixel in the m-th row is supplied to each of the signal lines OUT[1] to OUT[n] in the respective columns. Here, when the difference data of each pixel in the m-th row is finite (positive) in the first column, finite (positive) in the second column, finite (negative) in the n-th column, and zero in other columns, and values of currents supplied to the signal line OUT[1], the signal line OUT[2], and the signal line OUT[n] in the respective columns are represented as (I0+ΔI1), (I0+ΔI2), and (I0−ΔIn), respectively, current values of the current Ip[1], the current Ip[2], and the current Ip[n] flowing through the transistors 136 are equal to (I0+ΔI1), (I0+ΔI2), and (I0−ΔIn), respectively, and current values of currents Ic[1] to Ic[n] are equal to I0. As a result, currents with values ΔI1 and ΔI2 flow through the transistors 139 and the transistors 140 in the first and second columns, and current with the value ΔIn flows through the transistor 139 and the transistor 141 in the n-th column.

Here, in order that currents with the current values ΔI1 and ΔI2 flow in the transistors 140 in the first and second columns, current of a value I⁻=ΔI1+ΔI2 corresponding to the sum of the currents ΔI1 and ΔI2 needs to be supplied. Here, owing to the comparator CMP− and the transistor 142, the current I⁻ is supplied. That is, in the case where the current flowing in the transistor 140 in each column through the transistor 142 is smaller (larger) than ΔI1+ΔI2, the potential of the + terminal of the comparator CMP− decreases (increases), and thus, the output of the comparator CMP− decreases (increases). That is, the gate voltage of the transistor 142 decreases (increases): as a result, it becomes possible to supply a larger (smaller) current I⁻.

Here, in order that current with the current value ΔIn flows in the transistor 141 in the n-th column, current with a current value I⁺=ΔIn needs to be supplied. Here, owing to the comparator CMP– and the transistor 144, the current I⁺ can flow. That is, in the case where the current I⁺ flowing from the transistor 141 in the n-th column to the transistor 144 is smaller (larger) than the current ΔIn, the potential of a + terminal of the comparator CMP+ increases (decreases), and thus, the output of the comparator CMP+ increases (decreases). That is, the gate voltage of the transistor 144 increases (decreases); as a result, it becomes possible that a larger (smaller) current I⁺ flows.

Furthermore, since a potential which is equal to the potential of the gate of the transistor 142 is applied to the transistor 143, the current n1·I⁻ obtained by multiplying the current I⁻ by n1, the W/L ratio of the transistor 143 to the transistor 142 flows in the transistor 143.

Furthermore, since a potential that is equal to the potential of the gate of the transistor 144 is applied to the transistor 145, a current n2·I⁺ obtained by multiplying the current I⁺ by n2, the W/L ratio of the transistor 145 to the transistor 144 flows in the transistor 145. The current flowing in the transistor 145 also flows in the transistor 146, and a current n3·n2·I⁺ obtained by multiplying by n3, the W/L ratio of the transistor 147 to the transistor 146 flows in the transistor 147. Owing to a buffer formed using the transistor 148, the transistor 143, and the transistor 147, the determination signal TRIG is set at "H".

In one embodiment of the present invention with the above structure, a determination signal for newly applying a video voltage with a simple structure without a digital processing such as a difference processing can be generated.

<Structure of Display Device>

Figure 9A:
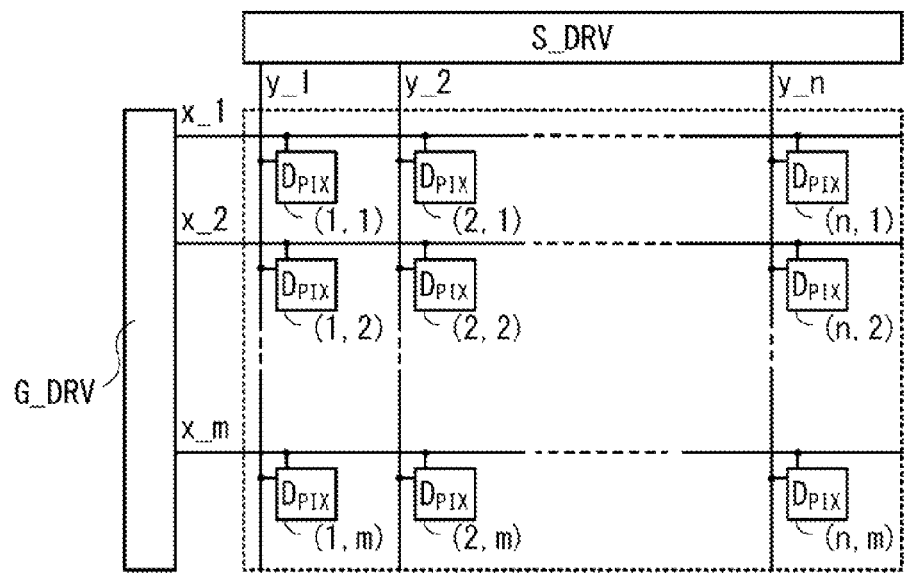
FIGS. 9A and 9B are each a block diagram showing one embodiment of the present invention.

FIG. 9A is a block diagram showing an example of a structure of a display device DISP where the pixels $D_{PIX}$, the source driver S_DRV, and the gate driver G_DRV are provided. In FIG. 9A, gate lines x_1 to x_m (m is a natural number) connected to the gate driver G_DRV and source lines y_1 to y_n (n is a natural number) connected to the source driver S_DRV are shown and the pixels $D_{PIX}$ are denoted by (1, 1) to (n, m).

Figure 9B:
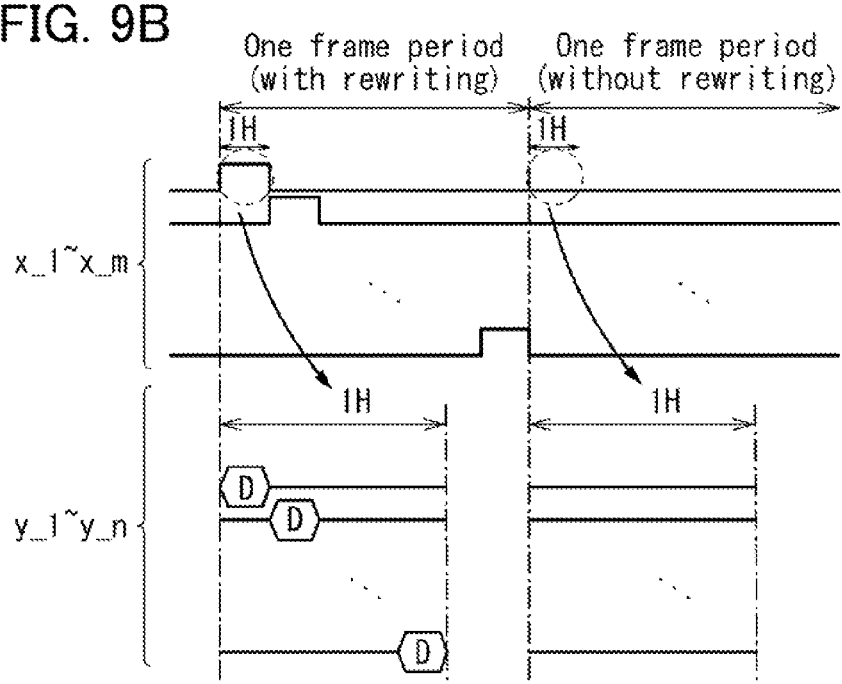

FIG. 9B is a timing chart of signals supplied to the gate lines and the source lines in the display element portion shown in FIG. 9A. In FIG. 9B, a frame period is divided into a frame in which a video signal is rewritten and a frame in which a video signal is not rewritten. Furthermore, in FIG. 9B, periods such as a retrace period are not taken into consideration.

In the above first display mode, a video voltage is rewritten every one frame period, on the basis of an image data. In this case, scan signals are supplied sequentially to the gate lines x_1 to x_m. In a horizontal scanning period 1H, during which the scan signal is at H level, video signals D are input to the source lines y_1 to y_n in the columns.

In the above second display mode, a video voltage D is held without using an image data. In this case, supply of scan signals to the gate lines x_1 to x_m is stopped. In the horizontal scanning period 1H, supply of video signals D to the source lines y_1 to y_n in the columns is stopped.

Figure 10A:
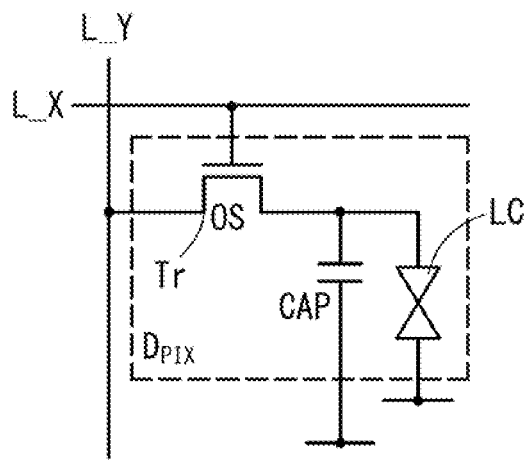
FIGS. 10A and 10B are circuit diagrams each showing one embodiment of the present invention.
Figure 10B:
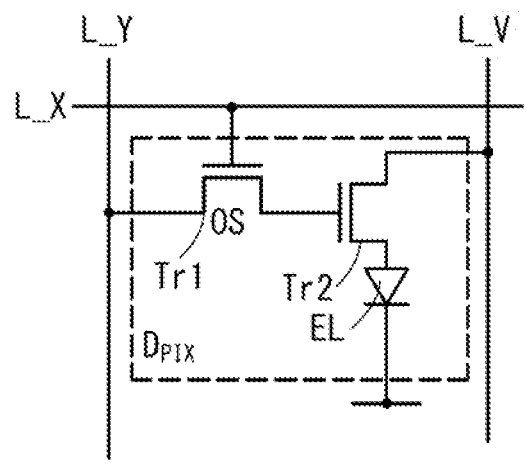

FIGS. 10A and 10B each show a circuit diagram of a structure example of the pixel $D_{PIX}$. FIG. 10A shows an example of a pixel in which a liquid crystal element is used as a display element, and FIG. 10B shows an example of the pixel in which a light-emitting element is used as a display element.

The pixel $D_{PIX}$ in FIG. 10A includes a transistor Tr, a liquid crystal element LC, and a capacitor CAP.

The transistor Tr is a switching element which controls electrical connection between the liquid crystal element LC and the source line L_Y. The transistor Tr is turned on or off by a scan signal input to its gate. For the transistor Tr, an OS transistor with a small amount of off-state current is preferably used.

The pixel $D_{PIX}$ in FIG. 10B includes a transistor Tr1, a transistor Tr2, and a light-emitting element El.

The transistor Tr1 is a switching element which controls electrical connection between a gate of the transistor Tr2 and the source line L_Y. The transistor Tr1 is turned on or off by a scan signal input to its gate. For the transistor Tr1, an OS transistor with a small amount of off-state current is preferably used. A source or a drain of the transistor Tr2 is electrically connected to a power source line L_V.

In the circuit diagrams in FIGS. 10A and 10B, "OS" is written in a circuit symbol of a transistor including oxide semiconductor in order to clearly demonstrate that the transistor is an OS transistor.

Unless otherwise specified, the off-state current in this specification refers to a drain current of a transistor in the off state (also referred to as non-conduction state and cutoff state). Unless otherwise specified, the off state of an n-channel transistor means that the voltage between its gate and source (Vgs: gate-source voltage) is lower than the threshold voltage Vth, and the off state of a p-channel transistor means that the gate-source voltage Vgs is higher than the threshold voltage Vth. For example, the off-state current of an n-channel transistor sometimes refers to a drain current that flows when the gate-source voltage Vgs is lower than the threshold voltage Vth.

The off-state current of a transistor depends on Vgs in some cases. Thus, "the off-state current of a transistor is lower than or equal to I" may mean "there is Vgs with which the off-state current of the transistor becomes lower than or equal to I". Furthermore, "the off-state current of a transistor" means "the off-state current in an off state at predetermined Vgs", "the off-state current in an off state at Vgs in a predetermined range", "the off-state current in an off state at Vgs with which sufficiently reduced off-state current is obtained", or the like.

As an example, the assumption is made of an n-channel transistor where the threshold voltage Vth is 0.5 V and the drain current is $1\times10^{-9}$ A at Vgs of 0.5 V, $1\times10^{-13}$ A at Vgs of 0.1 V, $1\times10^{-19}$ A at Vgs of –0.5 V, and $1\times10^{-22}$ A at Vgs of –0.8 V. The drain current of the transistor is $1\times10^{-19}$ A or lower at Vgs of –0.5 V or at Vgs in the range of –0.8 V to –0.5 V; therefore, it can be said that the off-state current of the transistor is $1\times10^{-19}$ A or lower. Since there is Vgs at which the drain current of the transistor is $1\times10^{-22}$ A or lower, it may be said that the off-state current of the transistor is $1\times10^{-22}$ A or lower.

In this specification, the off-state current of a transistor with a channel width W is sometimes represented by a current value in relation to the channel width W or by a current value per given channel width (e.g., 1 μm). In the latter case, the off-state current may be represented with a unit meaning current per length (e.g., A/μm).

The off-state current of a transistor depends on temperature in some cases. Unless otherwise specified, the off-state current in this specification may be an off-state current at room temperature, 60° C., 85° C., 95° C., or 125° C. Alternatively, the off-state current may be an off-state current at a temperature at which the reliability required for a semiconductor device or the like including the transistor is ensured or a temperature at which the semiconductor device or the like is used (e.g., temperature in the range of 5° C. to 35° C.). The case where the off-state current of the transistor is lower than or equal to I may indicate the existence of a value of Vgs at which the off-state current of the transistor is lower than or equal to 1 at room temperature, 60° C., 85° C., 95° C., or 125° C., at a temperature where the reliability required for a semiconductor device or the like including the transistor is ensured, or at a temperature where the semiconductor device or the like is used (e.g., temperature in the range of 5° C. to 35° C.).

The off-state current of a transistor depends on voltage Vds between its drain and source in some cases. Unless otherwise specified, the off-state current in this specification may be an off-state current at Vds of 0.1 V, 0.8 V, 1 V, 1.2 V, 1.8 V, 2.5 V, 3 V, 3.3 V, 10 V, 12 V, 16 V, or 20 V. Alternatively, the off-state current might be off-state current at Vds at which the required reliability of a semiconductor device or the like including the transistor is ensured or Vds used in the semiconductor device or the like including the transistor. The case where the off-state current of the transistor is lower than or equal to 1 may indicate the existence of Vgs at which the off-state current of the transistor is lower than or equal to 1 at Vds of 0.1 V, 0.8 V, 1 V, 1.2 V, 1.8 V, 2.5 V, 3 V, 3.3 V, 10 V, 12 V, 16 V, or 20 V, Vds where the required reliability of a semiconductor device or the like including the transistor is ensured or Vds used in the semiconductor device or the like including the transistor.

In the above description of off-state current, a drain may be replaced with a source. That is, the off-state current sometimes refers to a current that flows through a source of a transistor in the off state.

In this specification, the term "leakage current" sometimes expresses the same meaning as off-state current.

In this specification, the off-state current sometimes refers to a current that flows between a source and a drain when a transistor is off, for example.

Note that the pixel $D_{PIX}$ can hold the video voltage D in the second display mode. Thus, a transistor with a small amount of off-state current is not necessarily used in the pixel. The pixel $D_{PIX}$ may include a memory that can hold the video voltage.

Figure 25A:
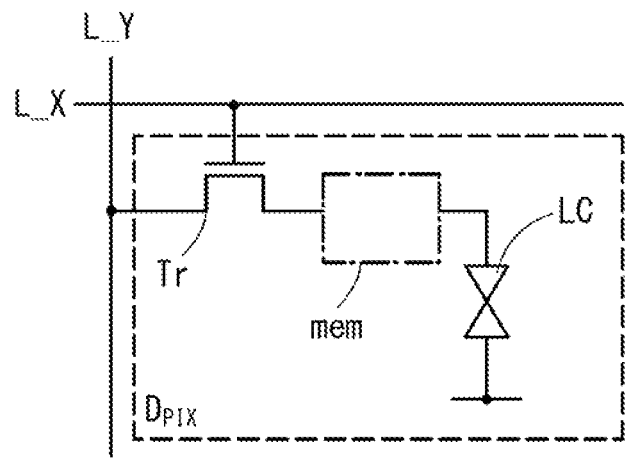
FIGS. 25A and 25B are circuit diagrams each showing one embodiment of the present invention.
Figure 25B:
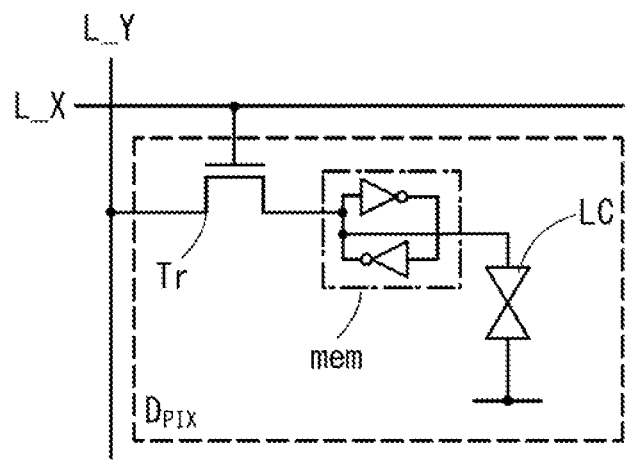

FIG. 25A shows a structure in which a memory is included in the pixel $D_{PIX}$. The pixel $D_{PIX}$ including a memory mem can hold a video data. As a memory, a memory circuit of an SRAM, a DRAM, or the like may be used. FIG. 25B shows an example of a circuit diagram in the case where an SRAM is used as the memory mem.

FIGS. 24A and 24B show examples of cross-sectional views of a display device. FIG. 24A is a schematic view of a cross section along A-B showing a transistor and its vicinity in the pixel $D_{PIX}$. FIG. 24B is a schematic view of a cross section along C-D showing a terminal portion and its vicinity.

FIGS. 24A and 24B illustrate a substrate 300, a transistor 301, a pixel electrode 302, a common electrode 303, an insulating film 304, an orientation film 305, a liquid crystal 306, a substrate 307, an orientation film 308, a wiring 309, a sealing layer 310, an FPC 311, and a conductive resin 312.

The display device shown in FIGS. 24A and 24B is a liquid crystal display device of a so-called horizontal electric field mode in which a potential difference is made between the pixel electrode 302 and the common electrode (e.g., an in-plane-switching (IPS) mode or a fringe field switching (FFS) mode). Note that the liquid crystal display device may employ a so-called vertical electric field mode (e.g., a TN mode, a VA mode, an MVA mode, a PVA mode, an STN mode, or an OCB mode).

The transistor 301 used for the pixel $D_{PIX}$ is preferably a transistor that can hold a video voltage. As an example, an OS transistor is preferably used.

The pixel electrode 302 and the common electrode 303 may be each formed using a light-transmitting conductive layer. For example, indium tin oxide (ITO) can be used.

Although FIGS. 24A and 24B show the structure in which liquid crystal is used as a display element, one embodiment of the present invention is not limited thereto, and a variety of modes or a variety of elements can be used. For example, a display element, a display device a light-emitting element or a light-emitting device includes at least one of an electroluminescence (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, electronic ink, an electrophoretic element, a grating light valve (GLV), a plasma display panel (PDP), a display element using micro electro mechanical system (MEMS), a digital micromirror device (DMD), a digital micro shutter (DMS), MIRASOL (registered trademark), an interferometric modulator (IMOD) element, a MEMS shutter display element, an optical-interference-type MEMS display element, an electrowetting element, a piezoelectric ceramic display, and a carbon nanotube. Other than the above, a display medium whose contrast, luminance, reflectance, transmittance, or the like is changed by electric or magnetic action may be included. Note that examples of display devices having EL elements include an EL display. Examples of display devices including electron emitters are a field emission display (FED) and an SED-type flat panel display (SED: surface-conduction electron-emitter display). Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Examples of a display device including electronic ink, electronic liquid powder (registered trademark), or electrophoretic elements include electronic paper. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. In the case of using an LED, a graphene or graphite may be provided below an LED electrode or a nitride semiconductor. The graphene or graphite may be a multi-layer film in which a plurality of layers are stacked. When the graphene or graphite is provided, a nitride semiconductor. e.g., an n-type GAN semiconductor layer having crystallinity can be easily formed thereover. In addition, a p-type GaN semiconductor layer having crystallinity is provided thereover; thus, an LED can be formed. Note that an ALN layer may be provided between the graphene or graphite and the n-type GaN semiconductor layer having crystallinity can be provided. The GaN semiconductor layer in the LED may be deposited by a MOCVD. Alternatively, in the case where the graphene is provided, the GaN semiconductor layer in the LED can be deposited by a sputtering method.

There is no particular limitation on the kind of substrate. As the substrate, a semiconductor substrate (e.g., a single crystal substrate or a silicon substrate), an SOI substrate, a glass substrate, a quartz substrate, a plastic substrate, a metal substrate, a stainless steel substrate, a substrate including stainless steel foil, a tungsten substrate, a substrate including tungsten foil, a flexible substrate, an attachment film, paper including a fibrous material, a base material film, or the like can be used, for example. As an example of a glass substrate, a barium borosilicate glass substrate, an aluminoborosilicate glass substrate, a soda lime glass substrate, or the like can be given. Examples of the flexible substrate, the attachment film, and the base material film are plastics typified by polyethylene terephthalate (PET), polyethylene naphthalate (PEN), and polyether sulfone (PES), polytetrafluoroethylene (PTFE), and the like. Another example is a synthetic resin such as acrylic. Furthermore, polypropylene, polyester, polyvinyl fluoride, and polyvinyl chloride can be given as examples. Other examples are polyamide, polyimide, aramid, epoxy, an inorganic vapor deposition film, paper, and the like. Specifically, the use of semiconductor substrates, single crystal substrates, SOI substrates, or the like enables the manufacture of small-sized transistors with a small variation in characteristics, size, shape, or the like and with high current capability. A circuit using such transistors achieves lower power consumption of the circuit or higher integration of the circuit.

Alternatively, a flexible substrate may be used as the substrate, and the transistor may be provided directly on the flexible substrate. Further alternatively, a separation layer may be provided between the substrate and the transistor. The separation layer can be used when part or the whole of a semiconductor device formed over the separation layer is separated from the substrate and transferred onto another substrate. In such a case, the transistor can be transferred to a substrate having low heat resistance or a flexible substrate as well. For the above separation layer, a stack including inorganic films, which are a tungsten film and a silicon oxide film, or an organic resin film of polyimide or the like formed over a substrate can be used, for example.

In other words, a transistor may be formed using one substrate, and then transferred to another substrate. Examples of a substrate to which a transistor is transferred include, in addition to the above substrate over which the transistor can be formed, a paper substrate, a cellophane substrate, an aramid film substrate, a polyimide film substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), a leather substrate, and a rubber substrate. When such a substrate is used, a transistor with excellent properties or a transistor with low power consumption can be formed, a device with high durability, high heat resistance can be provided, or reduction in weight or thickness can be achieved.

With the above structure, one embodiment of the present invention enables a display device to operate by switching between a first display mode in which an image is displayed with a video voltage based on an image data and a second display mode in which an image is displayed with a video voltage held without an image data.

Embodiment 2

In this embodiment, a modified example of the pixel $I_{PIX}$ described in the above embodiment is described.

Figure 11A:
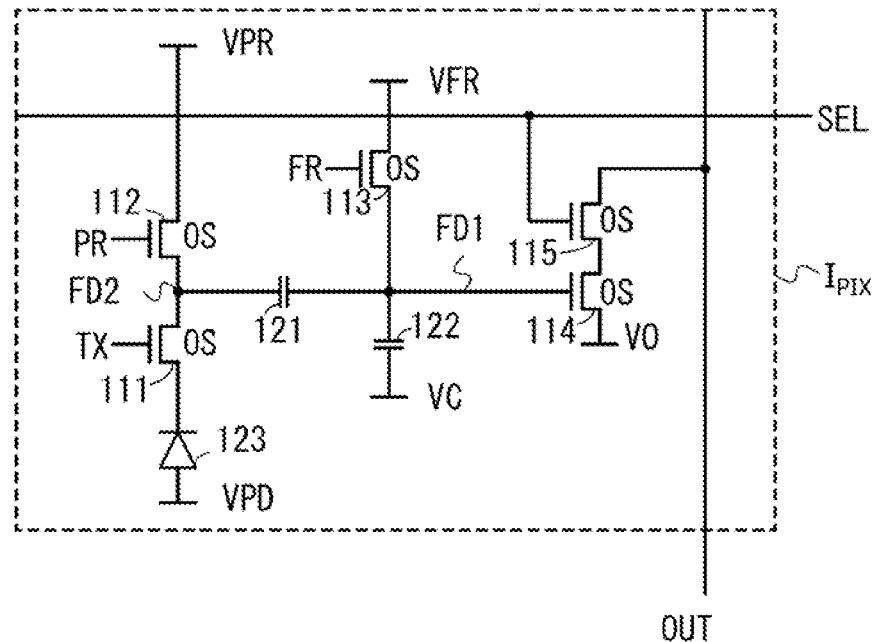
FIGS. 11A and 11B are circuit diagrams each showing one embodiment of the present invention.

FIG. 11A illustrates a modification example of the circuit diagram in FIG. 4A in which the semiconductor layers of the transistors are each formed using an oxide semiconductor. In the pixel $I_{PIX}$ in FIG. 11A, the transistors 111 to 115 each include an oxide semiconductor in the semiconductor layer.

An OS transistor has ultralow off-state current characteristics. In the circuit in FIG. 11A, an increase in the intensity of light entering the photodiode reduces the potential of the node FD1. Since the OS transistor has an extremely low off-state current, a current corresponding to the gate potential can be accurately output even when the gate potential is extremely low. Thus, it is possible to broaden the detection range of illuminance, i.e., the dynamic range.

Since a period during which charge can be retained in the charge retention node FD1 can be extremely long owing to the extremely low off-state current characteristics of the OS transistor, a global shutter system can be used without a complicated circuit configuration and operation method, and thus, an image with little distortion can be easily obtained even in the case of a moving object. Furthermore, for the same reason, exposure time (a period for conducting charge accumulation operation) can be long; thus, the imaging device is suitable for imaging even in a low illuminance environment.

The OS transistor has lower temperature dependence of change in electrical characteristics than a transistor including silicon in a semiconductor layer (the transistor is also referred to Si transistor). Therefore, the OS transistor can be used at an extremely wide range of temperatures. Thus, an imaging device and a semiconductor device which include OS transistors are suitable for use in automobiles, aircrafts, and spacecrafts.

In the structure as shown in FIG. 11A, a pixel includes a photodiode formed using silicon and an OS transistor. When such a structure is employed, a Si transistor is not necessarily provided in the pixel, and accordingly, an effective area of the photodiode can be increased. Thus, the imaging sensitivity can be increased.

In addition to the pixel $I_{PIX}$, it is effective to use OS transistors for peripheral circuits such as an analog processing circuit Analog, the A/D converter ADC, the row driver R_DRV, and the column driver C_DRV. A structure in which only OS transistors are used as transistors in the peripheral circuits is effective for lowering the cost of imaging devices because a step of formation of Si transistors is not needed. Alternatively, a structure in which only OS transistors and p-channel Si transistors are used as transistors in the peripheral circuits is effective for lowering the cost of imaging devices because a step of formation of n-channel Si transistors is not needed. In addition, the peripheral circuits can be CMOS circuits, which is effective for lowering power consumption of the peripheral circuits, i.e., for lowering power consumption of the imaging device.

Figure 11B:
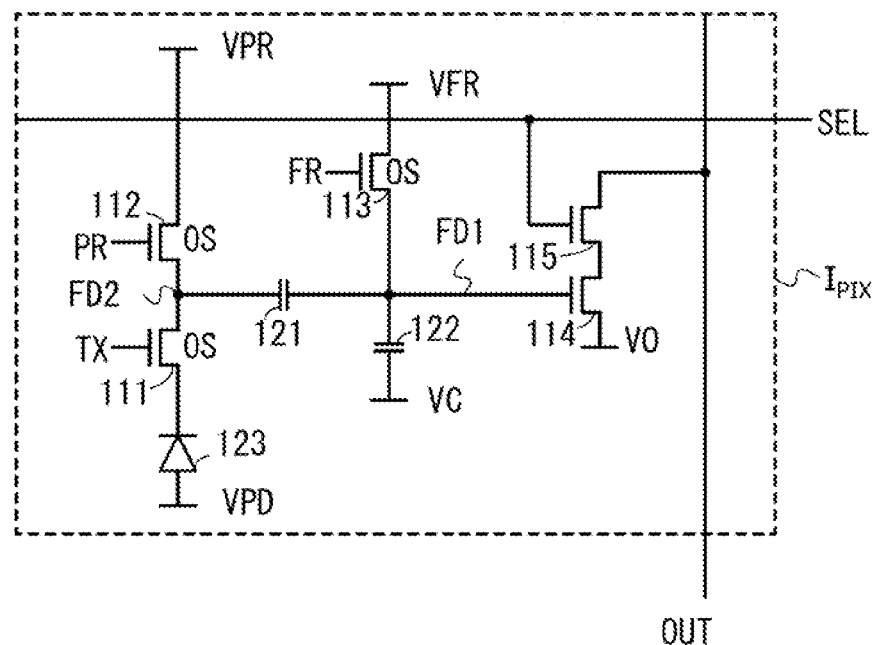

FIG. 11B is a circuit diagram of a pixel $I_{PIX}$, which is a modification example of the circuit diagram of FIG. 11A. In the pixel $I_{PIX}$ in FIG. 11B, the transistors 114 and 115 each include silicon in the semiconductor layer.

An Si transistor has better field-effect mobility than an OS transistor. Therefore, the amount of current flowing in a transistor functioning as an amplifier transistor can be increased. For example, in FIG. 11B, the amount of current flowing in the transistors 114 and 115 can be increased depending on charge accumulated in the node FD1.

Figure 12:
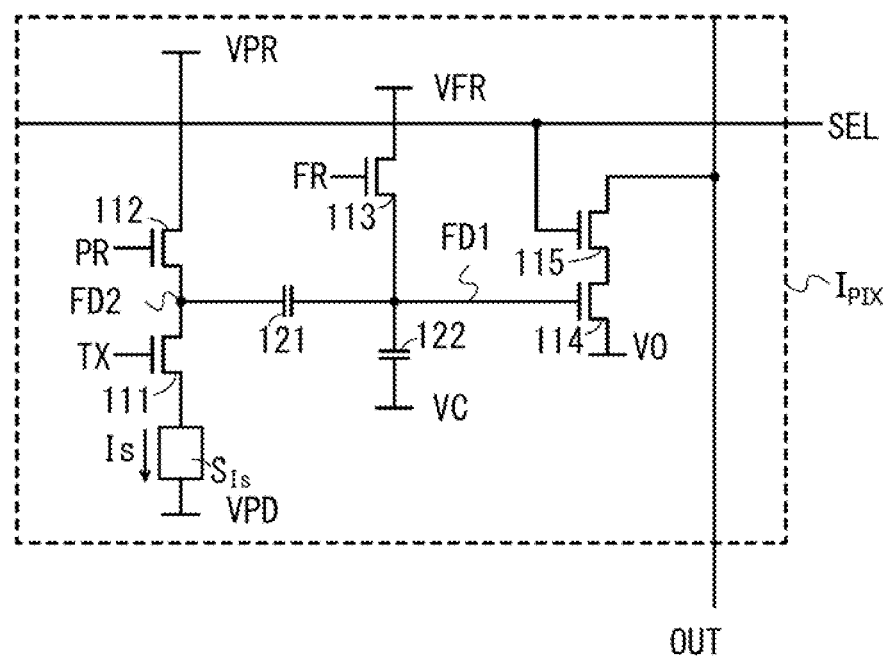
FIG. 12 is a circuit diagram showing one embodiment of the present invention.

FIG. 12 is a circuit diagram of a pixel $I_{PIX}$ that is the circuit diagram of FIG. 4A in which the photodiode PD is replaced with a sensor $S_{IS}$.

An element which is capable of converting a given physical amount into the amount of current Is flowing in the element may be preferable as the sensor $S_{IS}$. Alternatively, an element which is capable of converting a given physical amount into another physical amount and then converting it into the amount of current flowing in the element may be preferable.

For the sensor $S_{IS}$, a variety of sensors can be used. For example, the sensor $S_{IS}$ can be a temperature sensor, an optical sensor, a gas sensor, a flame sensor, a smoke sensor, a humidity sensor, a pressure sensor, a flow sensor, a vibration sensor, a voice sensor, a magnetic sensor, a radiation sensor, a smell sensor, a pollen sensor, an acceleration sensor, an inclination sensor, a gyro sensor, a direction sensor, or a power sensor.

For example, when an optical sensor is used as the sensor $S_{IS}$, the above-described photodiode or a phototransistor can be used.

When a gas sensor is used as the sensor $S_{IS}$, a semiconductor gas sensor which detects change in resistance due to exposure of a gas to a metal oxide semiconductor such as tin oxide, a catalytic combustion type gas sensor, or a solid electrolyte-type gas sensor can be used.

Figure 22A:
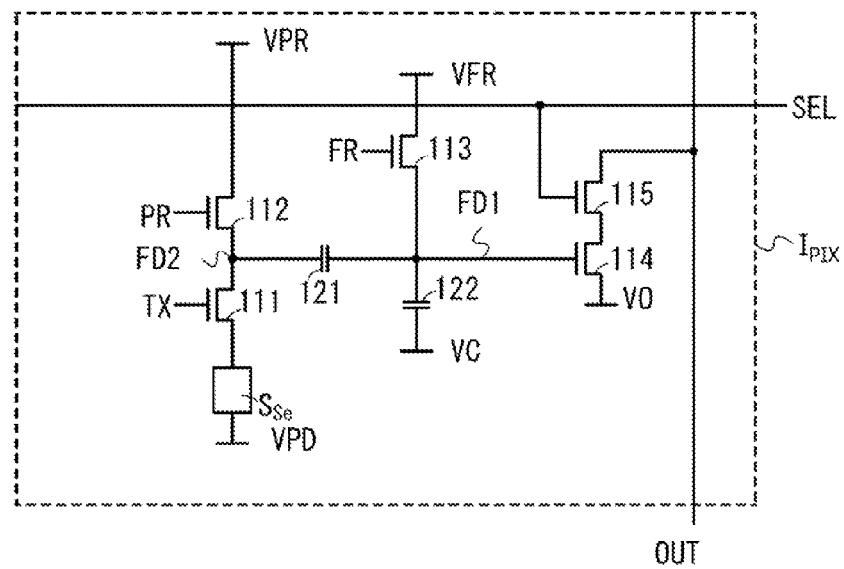
FIGS. 22A to 22C are a circuit diagram and a cross-sectional view illustrating one embodiment of the present invention.

FIG. 22A is a circuit diagram of a pixel $I_{PIX}$ in which the photodiode PD of the circuit diagram of FIG. 4A or the sensor $S_{IS}$ of the circuit diagram of FIG. 12 is replaced with a selenium-based semiconductor element $S_{Se}$ which is a photoelectric conversion element.

The selenium-based semiconductor element $S_{Se}$ is an element which is capable of conducting photoelectric conversion utilizing a phenomenon called avalanche multiplication, in which a plurality of electrons can be taken from one incident photon by application of voltage. Therefore, in the pixel $I_{PIX}$ including the selenium-based semiconductor element $S_{Se}$, the gain of electrons to the amount of incident light can be large, therefore, a highly sensitive sensor can be obtained.

For the selenium-based semiconductor element $S_{Se}$, a selenium-based semiconductor including an amorphous structure or a selenium-based semiconductor including a crystalline structure can be used. For example, the selenium-based semiconductor including a crystalline structure may be obtained in such a manner that a selenium-based semiconductor including an amorphous structure is deposited and subjected to heat treatment. Note that it is preferable that the crystal grain diameter of the selenium-based semiconductor including a crystalline structure be smaller than a pixel pitch because variation in characteristics of the pixels is reduced and the image quality of an image to be obtained becomes uniform.

A selenium-based semiconductor including a crystalline structure among the selenium-based semiconductors $S_{Se}$ has a characteristic of having a light absorption coefficient in a wide wavelength range. Therefore, the element using selenium-based semiconductor including a crystalline structure can be used as a photoelectric conversion element for light in a wide wavelength range, such as visible light, ultraviolet light. X-rays, and gamma rays, and can be used as what is called a direct conversion element, which is capable of directly converting light in a short wavelength range, such as X-rays and gamma rays, into electric charge.

Figure 22B:
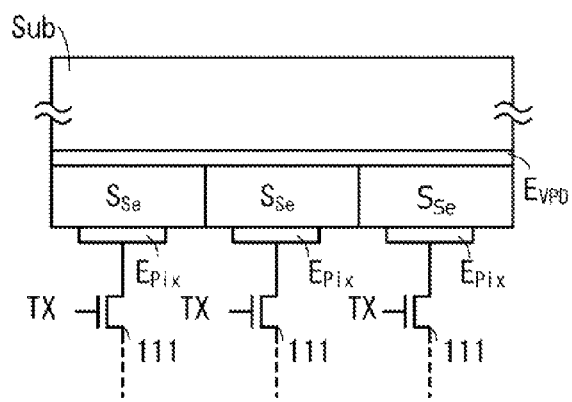

FIG. 22B is a cross-sectional schematic view corresponding to part of the circuit configuration of FIG. 22A. FIG. 22B illustrates the transistors 111, electrodes $E_{pix}$ connected to the transistors 111, the selenium-based semiconductor elements $S_{Se}$, an electrode $E_{VPD}$, and a substrate Sub.

Light is emitted from the side where the electrode $E_{VPD}$ and the substrate Sub are formed toward the selenium-based semiconductor elements $S_{Se}$. Therefore, the electrode $E_{VPD}$ and the substrate Sub preferably transmit light. Indium tin oxide (ITO) can be used for the electrode $E_{VPD}$, and a glass substrate can be used as the substrate Sub.

The selenium-based semiconductor elements $S_{Se}$ and the electrodes $E_{VPD}$ stacked over the selenium-based semiconductor elements $S_{Se}$ can be used without being processed in their shapes in accordance with each pixel. A step for processing the shape can be omitted, leading to a reduction in the manufacturing cost and improvement in the manufacturing yield.

For example, a chalcopyrite-based semiconductor can be used for the selenium-based semiconductor $S_{Se}$. Specifically, $CuIn_{1-x}Ga_xSe_2$ (0≤x≤1, abbreviated to CIGS) can be used, for example. CIGS can be formed by an evaporation method, a sputtering method, or the like.

The selenium-based semiconductor $S_{Se}$ that is a chalcopyrite-based semiconductor can perform avalanche multiplication by being applied with a voltage of several volts (from 5 V to 20 V). By application of voltage to the selenium-based semiconductor $S_{Se}$, the movement of signal charge generated owing to light irradiation can have high linearity Note that when the thickness of the selenium-based semiconductor $S_{Se}$ is smaller than or equal to 1 μm, the application voltage can be made smaller.

Note that in the case where the thickness of the selenium-based semiconductor $S_{Se}$ is small, dark current flows at the time of application of voltage; however, providing a layer for inhibiting the dark current from flowing in the CIGS that is a chalcopyrite-based semiconductor (hole-injection barrier layer) can prevent the dark current from flowing. An oxide semiconductor such as gallium oxide can be used for the hole-injection barrier layer. The thickness of the hole-injection barrier layer is preferably smaller than that of the selenium-based semiconductor $S_{Se}$.

Figure 22C:
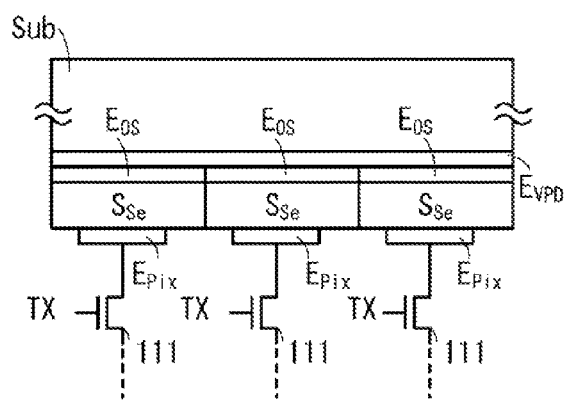

FIG. 22C is a schematic cross-sectional view different from that of FIG. 22B. FIG. 22C shows hole-injection barrier layers $E_{OS}$ together with the transistors 111, the electrodes $E_{pix}$ connected to the transistors 111, the selenium-based semiconductor elements $S_{Se}$, the electrode $E_{VPD}$, and the substrate Sub.

As described above, use of the selenium-based semiconductor element $S_{Se}$ as a sensor can reduce the manufacturing cost and characteristic variation among pixels and improves the manufacturing yield; as a result, a highly sensitive sensor can be obtained.

This embodiment can be implemented in combination with any of the other embodiments as appropriate.

Embodiment 3

In this embodiment, a cross-sectional structure of elements included in an imaging device is described with reference to drawings. A cross section of the structure described in FIG. 11B in Embodiment 2, in which a pixel is formed using the Si transistors and the OS transistors, is described in this embodiment as an example.

Figure 13A:
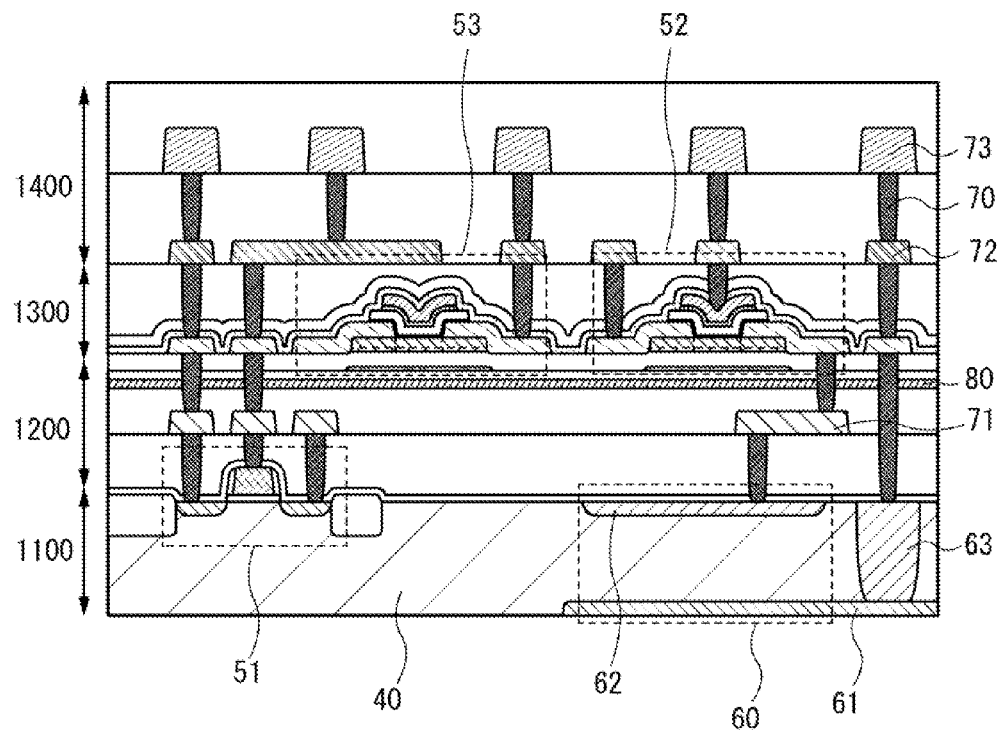
FIGS. 13A and 13B are cross-sectional views each illustrating one embodiment of the present invention.
Figure 13B:
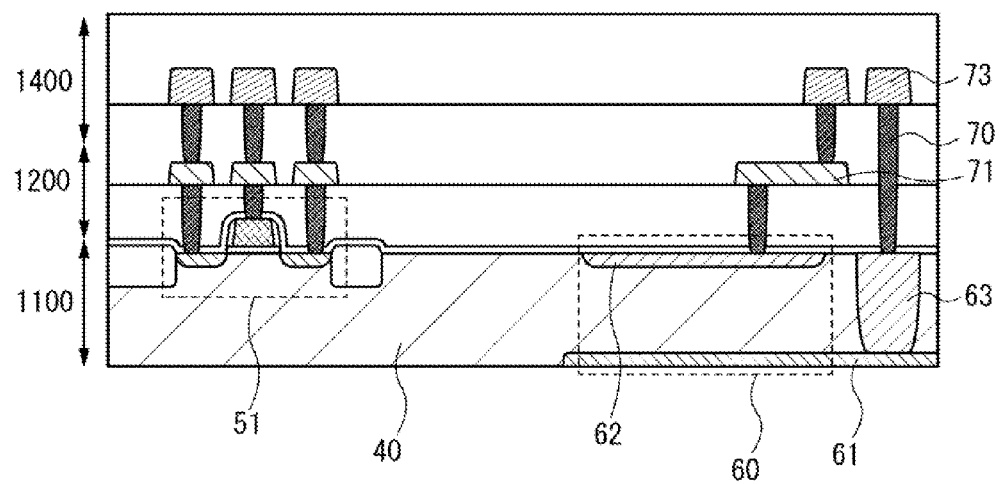

FIGS. 13A and 13B are cross-sectional views of elements included in an imaging device. The imaging device in FIG. 13A includes a Si transistor 51 provided on a silicon substrate 40, OS transistors 52 and 53 stacked over the Si transistor 51, and a photodiode 60 provided in the silicon substrate 40. The transistors and the photodiode 60 are electrically connected to contact plugs 70 and wiring layers 71. In addition, an anode 61 of the photodiode 60 is electrically connected to the contact plug 70 through a low-resistance region 63.

The imaging device includes a layer 1100 including the Si transistor 51 provided on the silicon substrate 40 and the photodiode 60 provided in the silicon substrate 40, a layer 1200 which is in contact with the layer 1100 and includes the wiring layers 71, a layer 1300 which is in contact with the layer 1200 and includes the OS transistors 52 and 53, and a layer 1400 which is in contact with the layer 1300 and includes wiring layers 72 and wiring layers 73.

In the example of the cross-sectional view in FIG. 13A, a surface of the silicon substrate 40 opposite to a surface where the Si transistor 51 is formed includes a light-receiving surface of the photodiode 60. With the above structure, a light path can be secured without an influence of the transistors and the wirings. Thus, a pixel with a high aperture ratio can be formed. Note that the light-receiving surface of the photodiode 60 can be the same as the surface where the Si transistor 51 is formed.

Note that in the case where the pixel is formed using the OS transistors described in FIG. 11A in Embodiment 2, a layer including the OS transistors may be used as the layer 1100. Alternatively, a structure in which the layer 1100 is not provided and the pixel is formed using only OS transistors may be employed.

In the case of forming a pixel with use of the Si transistors, the layer 1300 may be omitted. An example of a cross-sectional view in which the layer 1300 is not provided is shown in FIG. 13B.

Note that the silicon substrate 40 is not limited to a bulk silicon substrate and may be an SOI substrate. Furthermore, the silicon substrate 40 can be replaced with a substrate made of germanium, silicon germanium, silicon carbide, gallium arsenide, aluminum gallium arsenide, indium phosphide, gallium nitride, or an organic semiconductor.

An insulating layer 80 is provided between the layer 1100 including the Si transistor 51 and the photodiode 60 and the layer 1300 including the OS transistors 52 and 53 although there is no limitation on its specific position.

Hydrogen in an insulating layer provided in the vicinity of the active region of the Si transistor 51 terminates dangling bonds of silicon; accordingly, the reliability of the Si transistor 51 can be improved. Meanwhile, hydrogen in insulating layers provided in the vicinities of the oxide semiconductor layers, which are the active layers, of the OS transistors 52 and 53 provided in an upper portion becomes a factor of generating carriers in the oxide semiconductor; thus, the reliability of the OS transistors 52 and 53 might be decreased. Therefore, in the case where the transistor using an oxide semiconductor is provided over the transistor using a silicon-based semiconductor material, it is preferable that the insulating layer 80 having a function of preventing diffusion of hydrogen be provided between the transistors. The insulating layer 80 makes hydrogen remain in the lower portion, thereby improving the reliability of the Si transistor 51. In addition, since the insulating layer 80 prevents diffusion of hydrogen from the lower portion to the upper portion, the reliability of the OS transistors 52 and 53 also can be improved.

The insulating layer 80 can be, for example, formed using aluminum oxide, aluminum oxynitride, gallium oxide, gallium oxynitride, yttrium oxide, yttrium oxynitride, hafnium oxide, hafnium oxynitride, or yttria-stabilized zirconia (YSZ).

In the cross-sectional view of FIG. 13A, the photodiode 60 provided in the layer 1100 and the transistors provided in the layer 1300 can be formed to overlap each other. This structure can increase the degree of integration of pixels. In other words, the resolution of the imaging device can be increased.

As illustrated in FIGS. 23A1 and 23B1, the imaging device IMAG may be bent. FIG. 23A1 illustrates a state in which the imaging device IMAG is bent in the direction of dashed doubled-dotted line X1-X2. FIG. 23A2 is a cross-sectional view illustrating a portion indicated by dashed doubled-dotted line X1-X2 in FIG. 23A1. FIG. 23A3 is a cross-sectional view illustrating a portion indicated by two-dot chain line Y1-Y2 in FIG. 23A1.

FIG. 23B1 illustrates a state where the imaging device IMAG is bent in the direction of two-dot chain line X3-X4 and the direction of two-dot chain line Y3-Y4. FIG. 23B2 is a cross-sectional view illustrating a portion indicated by two-dot chain line X3-X4 in FIG. 23B1. FIG. 23B3 is a cross-sectional view illustrating a portion indicated by two-dot chain line Y3-Y4 in FIG. 23B1.

The bent imaging device IMAG enables the curved field and astigmatism to be reduced. Thus, the optical design of lens and the like, which is used in combination of the imaging device IMAG, can be facilitated. For example, the number of lens used for aberration correction can be reduced; accordingly, a reduction of size or weight of electronic devices using the imaging device IMAG, and the like, can be achieved. In addition, the quality of a captured image can be improved.

This embodiment can be implemented in combination with any of the other embodiments as appropriate.

Embodiment 4

In this embodiment, a cross-sectional structure of an example of an image device including a color filter and the like is described with reference to drawings.

Figure 14A:
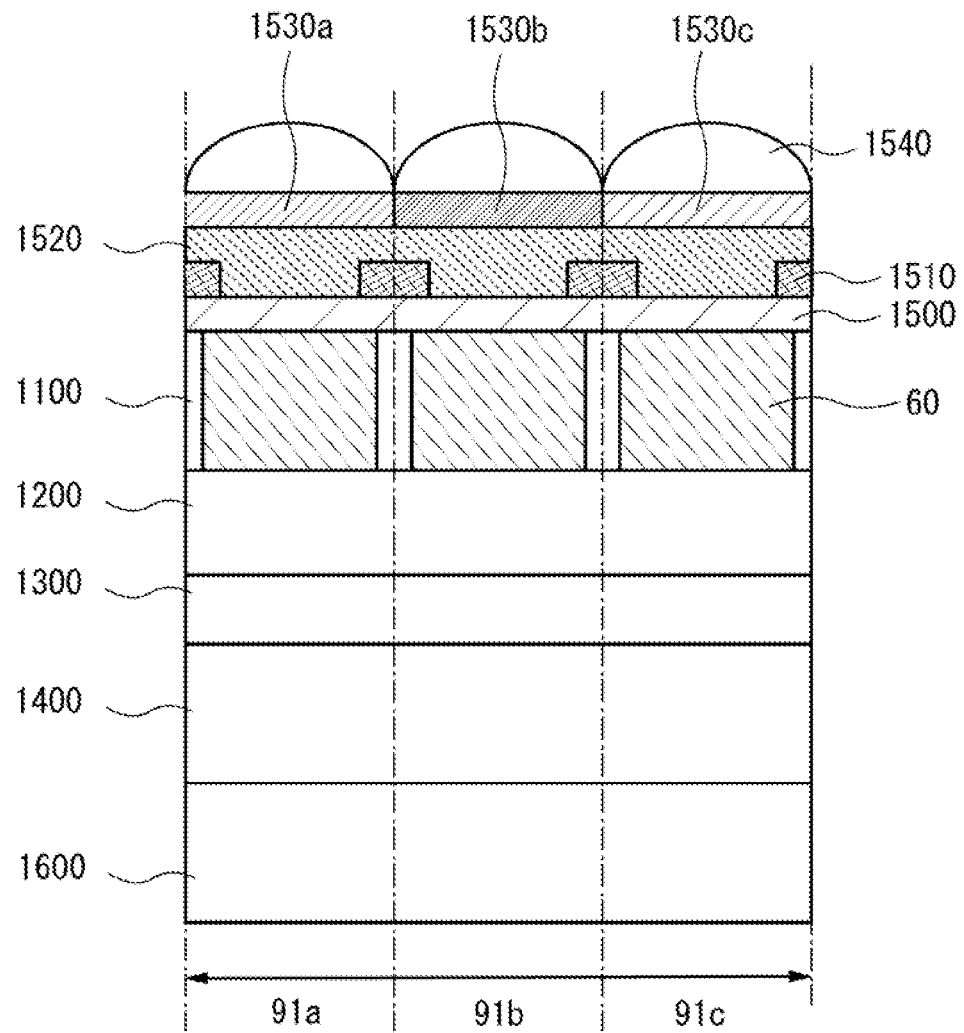
FIGS. 14A and 14B are cross-sectional views each illustrating one embodiment of the present invention.

FIG. 14A is a cross-sectional view of an example of a mode in which a color filter and the like are added to the imaging device in FIGS. 13A and 13B, illustrating a region occupied by circuits (circuits 91a, 91b, and 91c) corresponding to three pixels. An insulating layer 1500 is formed over the photodiode 60 provided in the layer 1100. As the insulating layer 1500, for example, a silicon oxide film with a high visible-light transmitting property can be used. In addition, a silicon nitride film may be stacked as a passivation film. In addition, a dielectric film of hafnium oxide or the like may be stacked as an anti-reflection film.

A light-blocking layer 1510 is formed over the insulating layer 1500. The light-blocking layer 1510 has a function of inhibiting color mixing of light passing through the color filter. The light-blocking layer 1510 can be formed of a metal layer of aluminum, tungsten, or the like, or a stack including the metal layer and a dielectric film functioning as an anti-reflection film.

An organic resin layer 1520 is formed as a planarization film over the insulating layer 1500 and the light-blocking layer 1510. A color filter 1530a, a color filter 1530b, and a color filter 1530c are formed over the circuit 91a, the circuit 91b, and the circuit 91c to be paired up with the circuit 91a, the circuit 91b, and the circuit 91c, respectively. The color filter 1530a, the color filter 1530b, and the color filter 1530c have colors of R (red), G (green), and B (blue), whereby a color image can be obtained.

A microlens array 1540 is provided over the color filters 1530a, 1530b, and 1530c so that light penetrating a lens goes through the color filter positioned therebelow to reach the photodiode.

A supporting substrate 1600 is provided in contact with the layer 1400. As the supporting substrate 1600, a hard substrate such as a semiconductor substrate (e.g., a silicon substrate), a glass substrate, a metal substrate, or a ceramic substrate can be used. Note that an inorganic insulating layer or an organic resin layer as an adhering layer may be between the layer 1400 and the supporting substrate 1600.

Figure 14B:
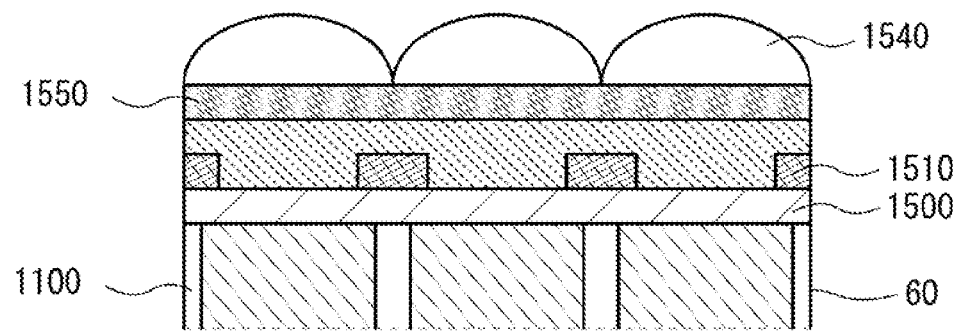

In the structure of the imaging device, an optical conversion layer 1550 (see FIG. 14B) may be used instead of the color filters 1530a, 1530b, and 1530c. When the optical conversion layer 1550 is used instead, the imaging device can capture images in various wavelength regions.

For example, when a filter which blocks light having a wavelength shorter than or equal to that of visible light is used as the optical conversion layer 1550, an infrared imaging device can be obtained. When a filter which blocks light having a wavelength shorter than or equal to that of infrared light is used as the optical conversion layer 1550, a far-infrared imaging device can be obtained. When a filter which blocks light having a wavelength longer than or equal to that of visible light is used as the optical conversion layer 1550, an ultraviolet imaging device can be obtained.

Furthermore, when a scintillator is used as the optical conversion layer 1550, an imaging device which takes an image visualizing the intensity of radiation, such as a medical X-ray imaging device, can be obtained. Radiation such as X-rays passes through a subject to enter a scintillator, and then is converted into light (fluorescence) such as visible light or ultraviolet light owing to a phenomenon known as photoluminescence. Then, the photodiode 60 detects the light to obtain image data.

The scintillator is formed of a substance that, when irradiated with radial rays such as X-rays or gamma-rays, absorbs energy of the radial rays to emit visible light or ultraviolet light or a material containing the substance. For example, materials such as $Gd_2O_2S$:Tb, $Gd_2O_2S$:Pr, $Gd_2O_2S$:Eu, BaFCl:Eu, NaI, CsI, $CaF_2$, $BaF_2$, CeF, LiF, LiI, and ZnO and a resin or ceramics in which any of the materials is dispersed are known.

This embodiment can be implemented in an appropriate combination with any of the structures described in the other embodiments.

Embodiment 5

In this embodiment, an application of the OS transistor described in the embodiment is described.

The off-state current of an OS transistor can be reduced by reducing the concentration of impurities in an oxide semiconductor to make the oxide semiconductor intrinsic or substantially intrinsic. The term "substantially intrinsic" refers to a state where an oxide semiconductor has a carrier density lower than $1\times10^{17}/cm^3$, preferably lower than $1\times10^{15}/cm^3$, further preferably lower than $1\times10^{13}/cm^3$. In the oxide semiconductor, hydrogen, nitrogen, carbon, silicon, and metal elements that are not main components are impurities. For example, hydrogen and nitrogen form donor levels to increase the carrier density.

A transistor using an intrinsic or substantially intrinsic oxide semiconductor has a low carrier density and thus is less likely to have negative threshold voltage. In addition, because of few carrier traps in the oxide semiconductor, the transistor including the oxide semiconductor has small variation in electrical characteristics and high reliability. Furthermore, a transistor including the oxide semiconductor enables to the off-state current to be extremely low.

For example, the OS transistor with reduced off-state current can exhibit a normalized off-state current per micrometer in channel width of $1\times10^{-18}$ A or less, preferably $1\times10^{-21}$ A or less, further preferably $1\times10^{-24}$ A or less at room temperature (approximately 25° C.), or $1\times10^{-15}$ A or less, preferably $1\times10^{-18}$ A or less, further preferably $1\times10^{-21}$ A or less at 85° C.

Note that the off-state current of an n-channel transistor refers to a current that flows between a source and a drain when the transistor is off. For example, the off-state current of an n-channel transistor with a threshold voltage of about 0 V to 2 V refers to a current that flows between a source and a drain when a negative voltage is applied between a gate and the source.

Note that at least indium (In) or zinc (Zn) is preferably contained as an oxide semiconductor used for the semiconductor layer of the OS transistor. In particular, In and Zn are preferably contained. A stabilizer for strongly bonding oxygen is preferably contained in addition to In and Zn. As a stabilizer, at least one of gallium (Ga), tin (Sn), zirconium (Zr), hafnium (HO), and aluminum (Al) may be contained.

As another stabilizer, one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu) may be contained.

As an oxide semiconductor used for the semiconductor layer of the transistor, for example, any of the following can be used: indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—Zr—Zn-based oxide, an In—Ti—Zn-based oxide, an In—Sc—Zn-based oxide, an In—Y—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

For example, an In—Ga—Zn-based oxide with an atomic ratio of In:Ga:Zn=1:1:1, In:Ga:Zn=3:1:2, or In:Ga:Zn=2:1:3, or an oxide with an atomic ratio close to the above atomic ratios can be used.

When the oxide semiconductor film forming the semiconductor layer contains a large amount of hydrogen, the hydrogen and the oxide semiconductor are bonded to each other, so that part of the hydrogen serves as a donor and causes generation of an electron which is a carrier. As a result, the threshold voltage of the transistor shifts in the negative direction. Therefore, it is preferable that, after formation of the oxide semiconductor film, dehydration treatment (dehydrogenation treatment) be performed to remove hydrogen or moisture from the oxide semiconductor film so that the oxide semiconductor film is highly purified to contain impurities as little as possible.

Note that oxygen in the oxide semiconductor film is also reduced by the dehydration treatment (dehydrogenation treatment) in some cases. Accordingly, it is preferable that oxygen be added to the oxide semiconductor film to fill oxygen vacancies increased by the dehydration treatment (dehydrogenation treatment).

In this manner, hydrogen or moisture is removed from the oxide semiconductor film by the dehydration treatment (dehydrogenation treatment) and oxygen vacancies therein are filled by the oxygen adding treatment, whereby the oxide semiconductor film can be turned into an i-type (intrinsic) or substantially i-type (intrinsic) oxide semiconductor film which is extremely close to an i-type oxide semiconductor film. Note that "substantially intrinsic" means that the oxide semiconductor film contains extremely few (close to zero) carriers derived from a donor and has a carrier density of lower than or equal to $1\times10^{17}/cm^3$, lower than or equal to $1\times10^{16}/cm^3$, lower than or equal to $1\times10^{15}/cm^3$, lower than or equal to $1\times10^{14}/cm^3$ or lower than or equal to $1\times10^{13}/cm^3$.

In this manner, the transistor including an i-type (intrinsic) or substantially i-type oxide semiconductor film can have extremely favorable off-state current characteristics.

This embodiment can be implemented in an appropriate combination with any of the structures described in the other embodiments.

Embodiment 6

In this embodiment, a case where the display system described in the above embodiment is used for a monitoring device (also referred to as a monitoring system) is described.

Figure 15:
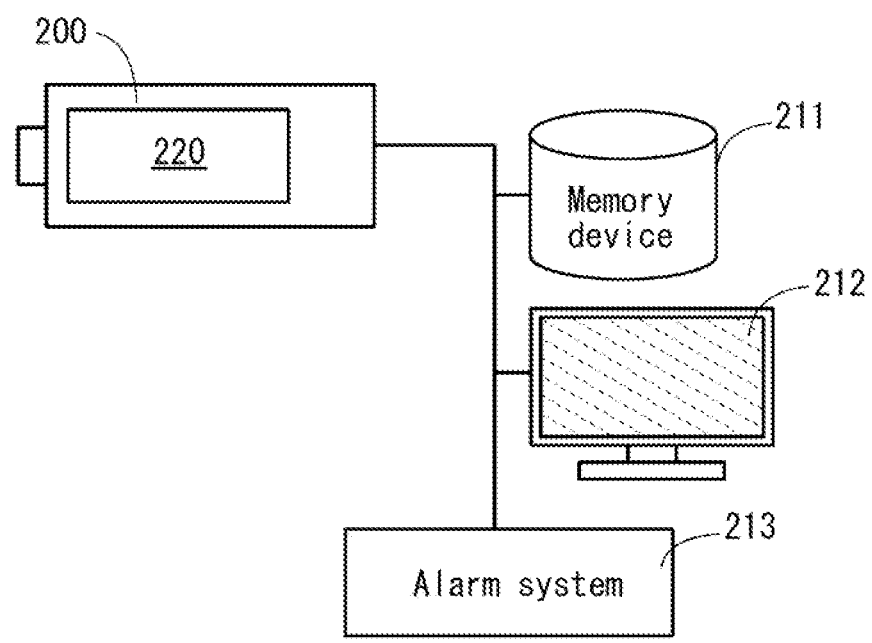
FIG. 15 is a block diagram showing an example of a configuration of a monitoring system.

FIG. 15 is a block diagram illustrating the structural example of the monitoring device of this embodiment. The monitoring device includes a camera 200, a memory device 211, a display device 212, and an alarm device 213. The camera 200 includes an imaging device 220. The camera 200, the memory device 211, the display device 212, and the alarm device 213 are functionally connected. The image taken by the camera 200 is stored in the memory device 211 and displayed in the display device 212. The alarm device 213 gives an alarm to an administrator when the camera 200 detects movement.

In the imaging device 220, a determination signal is generated when the camera 200) detects difference data. On the basis of the determination signal, the imaging device 220 performs analog processing and digital processing. Therefore, it is not necessary to continuously perform digital processing, which consumes a vast amount of power; thus, power consumption can be reduced. The display device 212 can have such a structure that the switching of a display mode in which an image data is updated or not can be performed in accordance with the switching of an imaging mode depending on the determination signal. Thus, power consumption of the driver circuit for driving pixels in the display device 212 can be reduced.

For example, a first state is set to a state where there is surely no intruder entering the monitored area, and a second state is set to the current state. Here, when there is not intruder in the state where the imaging device 220 operates in the second imaging mode, the first imaging data is the same as the second imaging data, and thus difference data is zero. Accordingly, the result of a sum-of-absolute-difference operation performed on the difference data read from each pixel in the analog processing circuit is zero, and no determination signal is generated. In contrast, when there is an intruder, the first imaging data is different from the second imaging data, and thus, difference data is infinite. Accordingly, the result of a sum-of-absolute-difference operation performed on the difference data read from each pixel in the analog processing circuit is finite, and the determination signal is generated. The mode of the imaging device 220 is switched to the first imaging mode in response to the generation of the determination signal, third imaging data is converted into digital data in the digital processing circuit, and detailed analysis of the captured image is executed by digital processing with a personal computer or the like. As a result, detailed information on the intruder can be obtained. In addition, the display device 212 can have such a structure that a display mode in which an image data is updated or not is switched in accordance with the switching of the imaging mode of the imaging device 220. Thus, power consumption of the driver circuit for driving pixels in the display device 212 can be reduced.

Therefore, in a period in which movement in the image is not detected, the imaging device 220 does not execute digital processing. As a result, the power consumption of the camera 200 can be reduced. Furthermore, since the memory capacity of the memory device 211 can be saved by image data in the period in which no movement is detected, recording for a longer period is possible. In the display device 212, the operation of the driving circuit in the period during which the image data is not updated is stopped, whereby the power consumption can be reduced.

Note that the alarm device 213 may give an alarm to those around the alarm device 213 when the determination signal is generated. Alternatively, whether or not an alarm is given may be determined on the basis of a result of comparison by a certification system.

This embodiment can be implemented in an appropriate combination with any of the structures described in the other embodiments.

Embodiment 7

In this embodiment, examples of electronic devices in which a display system using the imaging device and the display device of one embodiment of the present invention can be used are described.

Examples of an electronic devices in which the display of one embodiment of the present invention can be used are as follows: display devices such as televisions and monitors, lighting devices, desktop personal computers and laptop personal computers, word processors, image reproduction devices which reproduce still images and moving images stored in recording media such as digital versatile discs (DVDs), portable CD players, radios, tape recorders, headphone stereos, stereos, navigation systems, table clocks, wall clocks, cordless phone handsets, transceivers, mobile phones, car phones, portable game consoles, tablet terminals, large game machines such as pinball machines, calculators, portable information terminals, electronic notebooks, e-book readers, electronic translators, audio input devices, video cameras, digital still cameras, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electric power tools such as chain saws, smoke detectors, medical equipment such as dialyzers, facsimiles, printers, multifunction printers, automated teller machines (ATM), and vending machines. Other examples are as follows: industrial equipment such as guide lights, traffic lights, conveyor belts, elevators, escalators, industrial robots, power storage systems, and power storage devices for leveling the amount of power supply and smart grid. In addition, moving objects driven by an electric motor using electric power from a power storage device are also included in the category of electronic devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

Figure 16A:
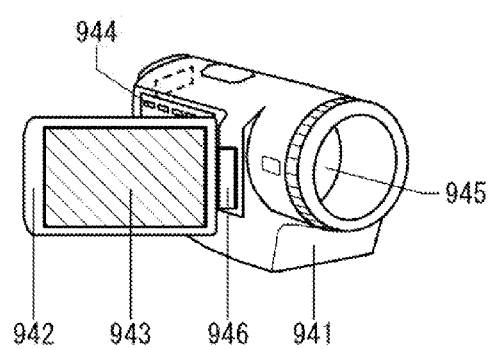
FIGS. 16A to 16F each illustrate an electronic device using a display system.

FIG. 16A illustrates a video camera, which includes a housing 941, a housing 942, a display portion 943, operation keys 944, a lens 945, a joint 946, and the like. The operation keys 944 and the lens 945 are provided in the housing 941, and the display portion 943 is provided in the housing 942. The housing 941 and the housing 942 are connected to each other with the joint 946, and the angle between the housing 941 and the housing 942 can be changed with the joint 946. Images displayed on the display portion 943 may be switched in accordance with the angle at the joint 946 between the housing 941 and the housing 942. The imaging device can be provided in a focus position of the lens 945, and with use of the display portion 943, the display system of one embodiment of the present invention can be used.

Figure 16B:
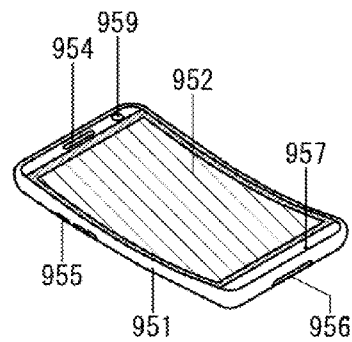

FIG. 16B illustrates a mobile phone which includes a display portion 952, a microphone 957, a speaker 954, a camera 959, an input/output terminal 956, an operation button 955, and the like in a housing 951. For the camera 959 and the display portion, the display system of one embodiment of the present invention can be used.

Figure 16C:
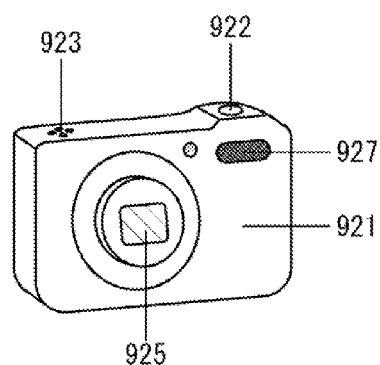

FIG. 16C illustrates a digital camera which includes a housing 921, a shutter button 922, a microphone 923, a light-emitting portion 927, a lens 925, and the like. An imaging device can be provided in a focus position of the lens 925, and with use of a display portion (not illustrated) in the housing 921, the display system of one embodiment of the present invention can be used.

Figure 16D:
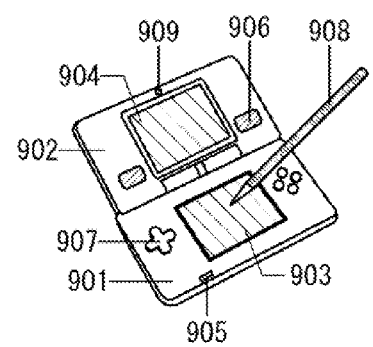

FIG. 16D illustrates a portable game machine, which includes a housing 901, a housing 902, a display portion 903, a display portion 904, a microphone 905, a speaker 906, an operation key 907, a stylus 908, a camera 909, and the like. Although the portable game machine in FIG. 16A has the two display portions 903 and 904, the number of display portions included in a portable game machine is not limited to this. For the camera 909 and the display portion 903, the display system of one embodiment of the present invention can be used.

Figure 16E:
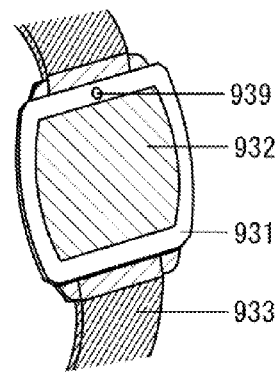

FIG. 16E illustrates a wrist-watch-type information terminal which includes a housing 931, a display portion 932, a wristband 933, a camera 939, and the like. The display portion 932 may be a touch panel. For the camera 939 and the display portion 932, the display system of one embodiment of the present invention can be used.

Figure 16F:
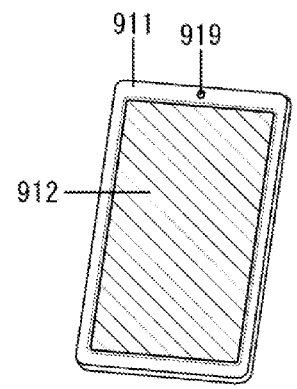

FIG. 16F illustrates a portable data terminal, which includes a housing 911, a display portion 912, a camera 919, and the like. A touch panel function of the display portion 912 enables input and output of information. For the camera 919 and the display portion 912, the display system of one embodiment of the present invention can be used.

Needless to say, the examples are not limited to the above-described electronic devices as long as the imaging device and the display device which can be used for the display system of one embodiment of the present invention are included.

This embodiment can be implemented in an appropriate combination with any of the structures described in the other embodiments.

This application is based on Japanese Patent Application serial no. 2014-147717 filed with Japan Patent Office on Jul. 18, 2014, the entire contents of which are hereby incorporated by reference.

What is claimed is:

1. A display system comprising:
    an imaging device comprising:
        an analog processing circuit and a digital processing circuit; and
        a first pixel, wherein the first pixel outputs a first imaging data, a second imaging data, and a third imaging data, and stores a difference data between the first imaging data and the second imaging data; and
    a display device comprising a second pixel and a controller,
    wherein the imaging device operates in a first imaging mode and a second imaging mode,
    wherein the display device operates in a first display mode and a second display mode,
    wherein in the first imaging mode, the digital processing circuit converts the third imaging data outputted from the first pixel into a digital data,
    wherein in the second imaging mode, the analog processing circuit sets a determination signal to an active value in accordance with the difference data,
    wherein in the first display mode, the display device displays a first image with an update of a first image data in a first frame period,
    wherein in the second display mode, the display device displays a second image without an update of a second image data in a second frame period, and
    wherein a switching from the second imaging mode to the first imaging mode and a switching from the second display mode to the first display mode are performed when the determination signal output from the analog processing circuit to the controller and to the digital processing circuit is set to the active value.

2. The display system according to claim 1, wherein the analog processing circuit comprises a subtraction circuit, an absolute value circuit, and an adder circuit.

3. The display system according to claim 1, wherein the analog processing circuit sets the determination signal to the active value in accordance with a sum-of-absolute-difference operation of the difference data.

4. The display system according to claim 1, wherein the analog processing circuit comprises a transistor, a capacitor, and a comparator.

5. The display system according to claim 1, wherein the analog processing circuit sets the determination signal to the active value in accordance with a current value corresponding to the difference data and a reference current value.

6. The display system according to claim 1, wherein the digital processing circuit comprises an A/D converter.

7. The display system according to claim 1, wherein the switching from the second imaging mode to the first imaging mode is performed in accordance with a predetermined time.

8. The display system according to claim 1,
    wherein the first pixel comprises a first transistor,
    wherein the second pixel comprises a second transistor, and
    wherein a channel formation region of each of the first transistor and the second transistor comprises an oxide semiconductor.

9. The display system according to claim 1, wherein the first pixel comprises a photoelectric conversion element.

10. The display system according to claim 1,
    wherein the first pixel comprises a photoelectric conversion element, and
    wherein the photoelectric conversion element comprises selenium.

11. The display system according to claim 1, wherein the second pixel comprises a liquid crystal element or a light-emitting element.

12. A monitoring device comprising:
the imaging device according to claim 1; and
a memory device and an alarm device which are functionally connected to the imaging device.

13. A display system comprising:
an imaging device comprising:
   an analog processing circuit and a digital processing circuit; and
   a first pixel, wherein the first pixel outputs a first imaging data, a second imaging data, and a third imaging data, and stores a difference data between the first imaging data and the second imaging data; and
a display device comprising a second pixel and a controller,
wherein the imaging device operates in a first imaging mode and a second imaging mode,
wherein the display device operates in a first display mode and a second display mode,
wherein in the first imaging mode, the digital processing circuit converts the third imaging data outputted from the first pixel into a digital data,
wherein in the second imaging mode, the analog processing circuit sets a determination signal to an active value in accordance with the difference data,
wherein in the first display mode, the display device displays a first image with an update of a first image data in a first frame period,
wherein in the second display mode, the display device displays a second image without an update of a second image data in a second frame period,
wherein a switching from the second imaging mode to the first imaging mode and a switching from the second display mode to the first display mode are performed when the determination signal output from the analog processing circuit to the controller and to the digital processing circuit is set to the active value, and
wherein in the first imaging mode, the analog processing circuit performs a sum-of-absolute-difference operation of first imaging data taken by the first pixel at a first time and second imaging data taken by the first pixel at a second time, and generates a trigger signal and outputs the determination signal when a result of the sum-of-absolute-difference operation is not the same as a predetermined value.

14. The display system according to claim 13, wherein the digital processing circuit comprises an A/D converter.

15. The display system according to claim 13, wherein the switching from the second imaging mode to the first imaging mode is performed in accordance with a predetermined time.

16. The display system according to claim 13,
wherein the first pixel comprises a first transistor,
wherein the second pixel comprises a second transistor, and
wherein a channel formation region of each of the first transistor and the second transistor comprises an oxide semiconductor.

17. The display system according to claim 13, wherein the first pixel comprises a photoelectric conversion element.

18. The display system according to claim 13,
wherein the first pixel comprises a photoelectric conversion element, and
wherein the photoelectric conversion element comprises selenium.

19. The display system according to claim 13, wherein the second pixel comprises a liquid crystal element or a light-emitting element.

20. A monitoring device comprising:
the imaging device according to claim 13; and
a memory device and an alarm device which are functionally connected to the imaging device.

* * * * *